(12) United States Patent
Wilborn et al.

(10) Patent No.: US 8,064,496 B2
(45) Date of Patent: Nov. 22, 2011

(54) INTERFERENCE CANCELLATION FOR WIRELESS COMMUNICATION

(75) Inventors: Thomas B. Wilborn, San Diego, CA (US); Brian Clarke Banister, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 780 days.

(21) Appl. No.: 12/020,417

(22) Filed: Jan. 25, 2008

(65) Prior Publication Data

US 2008/0130714 A1 Jun. 5, 2008

Related U.S. Application Data

(63) Continuation-in-part of application No. 11/285,510, filed on Nov. 21, 2005.

(51) Int. Cl.
 *H04B 1/00* (2006.01)
(52) U.S. Cl. ........ 375/147; 329/320; 375/130; 375/144; 375/148; 375/E1.032; 382/281
(58) Field of Classification Search .................... 370/342
 See application file for complete search history.

(56) References Cited

U.S. PATENT DOCUMENTS

| | | | |
|---|---|---|---|
| 5,551,057 A | 8/1996 | Mitra | |
| 5,737,327 A * | 4/1998 | Ling et al. | 370/335 |
| 5,757,791 A * | 5/1998 | Kanterakis et al. | 370/342 |
| 6,108,565 A | 8/2000 | Scherzer | |
| 6,404,760 B1 * | 6/2002 | Holtzman et al. | 370/342 |
| 6,501,788 B1 | 12/2002 | Wang et al. | |
| 6,920,192 B1 | 7/2005 | Laroia et al. | |
| 2003/0030727 A1 | 2/2003 | Gibbs et al. | |
| 2003/0076872 A1 | 4/2003 | Jalloul et al. | |
| 2003/0215007 A1 | 11/2003 | Mottier | |
| 2005/0111405 A1 | 5/2005 | Kanterakis | |

FOREIGN PATENT DOCUMENTS

| | | |
|---|---|---|
| CN | 1459948 A | 12/2003 |
| EP | 0993127 A1 | 4/2000 |
| JP | 2004208070 A | 7/2004 |

OTHER PUBLICATIONS

Patel et al.; Analysis of a DS CDMA successive interference cancellation scheme using correlations; Nov.29-Dec. 2, 1993 ; IEEE Global Telecommunications Conference; pp. 76-80.*

(Continued)

*Primary Examiner* — David C Payne
*Assistant Examiner* — Adolf Dsouza
(74) *Attorney, Agent, or Firm* — Jonathan T. Velasco; Sayed H. Beladi

(57) ABSTRACT

Interference in a wireless communication is minimized, or at least reduced, by scaling the symbols received from an interfering transmitter. Input samples from the interfering transmitter are isolated and decovered to generate received symbols. The gains of the received symbols are scaled to reduce the interference and the scaled symbols are covered to produce output samples that are spread to generate interference cancelled samples with reduced interference from the interfering transmitter. The function applied to scale the symbols may be linear or nonlinear.

50 Claims, 25 Drawing Sheets

OTHER PUBLICATIONS

Mouhouche et al, "On the Effect of Power and Channel Estimation in Equalized Blind PIC for Downlink Mulitrate CDMA Communications", Signals, Systems, and Computers, 2004. Conference Record of the Thirty-Eighth Asilomar Conference on Pacific Grove, CA, Nov. 7-10, 2004, pp. 612-616, Piscataway, NJ, USA.

International Search Report and Written Opinion, PCT/US2006/061163, International Search Authority/EPO, Sep. 27, 2007, 15 pages.

Oppenheim et al.; Digital Signal Processing; Prentice Hall, 1975, p. 125.

* cited by examiner

INTERFERENCE CANCELLATION FOR WIRELESS COMMUNICATION

CLAIM OF PRIORITY UNDER 35 U.S.C. §120

The present Application for Patent is a continuation in part (CIP) of patent application Ser. No. 11/285,510 entitled "QUASI-LINEAR INTERFERENCE CANCELLATION FOR WIRELESS COMMUNICATION" filed Nov. 21, 2005, pending, and assigned to the assignee hereof and hereby expressly incorporated by reference herein.

BACKGROUND

1. Field

The present disclosure relates generally to communication, and more specifically to techniques for performing interference cancellation in a wireless communication system.

2. Background

A wireless multiple-access communication system can concurrently communicate with multiple wireless devices, e.g., cellular phones. Examples of such multiple-access systems include code division multiple access (CDMA) systems, time division multiple access (TDMA) systems, and frequency division multiple access (FDMA) systems.

A wireless multiple-access system typically includes many base stations that provide communication coverage for a large geographic area. Each base station may transmit data to one or more wireless devices located within its coverage area at any given moment. A given wireless device may receive a desired transmission from a serving base station as well as interfering transmissions from nearby base stations. These interfering transmissions are intended for other wireless devices located within the coverage areas of these nearby base stations but act as interference to this given wireless device. The interference hinders the wireless device's ability to demodulate the desired transmission and has a large impact on performance.

There is therefore a need in the art for techniques to demodulate a desired transmission in the presence of interfering transmissions in a wireless communication system.

SUMMARY

Interference in a wireless communication is minimized, or at least reduced, by scaling the symbols received from an interfering transmitter. Input samples from the interfering transmitter are isolated and decovered to generate received symbols. The gains of the received symbols are scaled to reduce the interference and the scaled symbols are covered to produce output samples that are spread to generate interference cancelled samples with reduced interference from the interfering transmitter. The function applied to scale the symbols may be linear or nonlinear.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

Figure 1:
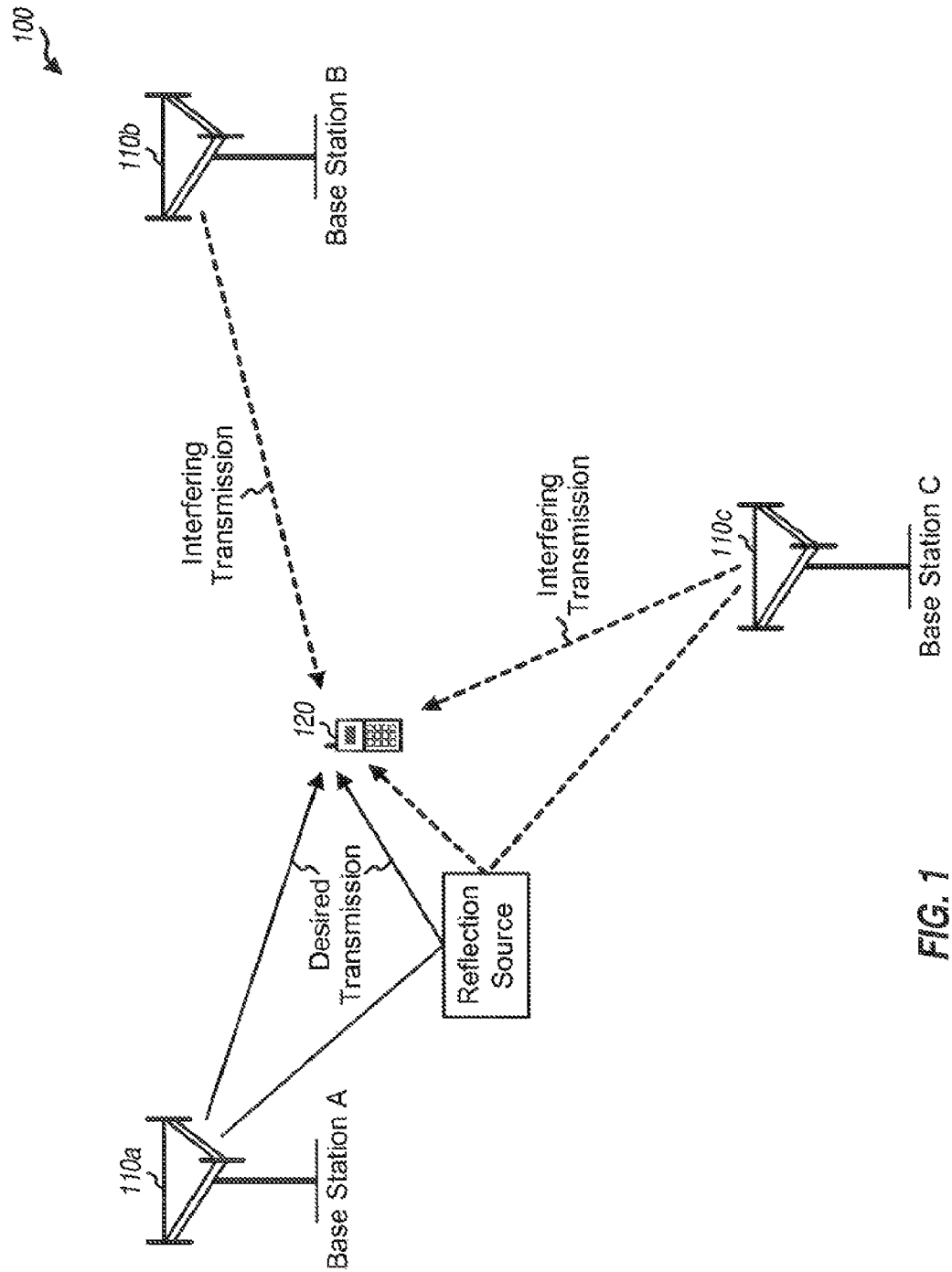
FIG. 1 shows a CDMA system with multiple base stations.

The interference cancellation techniques may be preformed with any of various for implementations within a wireless communication system such as a CDMA system. Interference in a wireless communication is minimized, or at least reduced, by scaling the symbols received from an interfering transmitter. As used herein, cancellation and suppression are synonymous terms and are used interchangeably. The techniques improve performance for a wireless device in many situations. The effects of interference are reduced in some situations which may increase the capacity of an interference limited system such as a CDMA system.

As discussed below in further detail, an interference canceller despreads, or otherwise processes, received samples to isolate the input samples received from an interfering transmitter such as a base station or sector. The input samples are further processed to decover the input samples and provide received symbols to a symbol processor which scales the gains of the symbols with multiple gains. The resulting scaled symbols are covered and then spread to generate interference-cancelled symbols that have reduced interference from the interfering transmitter. The scaling function applied by the symbol processor may be linear or nonlinear. Interference from multiple sectors is reduced by scaling the symbols from each interfering transmitter by processing the received samples in parallel or in series.

In an embodiment of a parallel multi-sector interference canceller, at least one cancellation signal for at least one interfering transmitter is derived by isolating a signal from each interfering transmitter with a spreading code for that interfering transmitter. Each cancellation signal comprises the signal component for an interfering transmitter and may be obtained, e.g., by subtracting the interference-canceled samples for that interfering transmitter from the received samples. A signal estimate for a desired transmitter is derived based on the received signal and the at least one cancellation signal, e.g., by subtracting the cancellation signal(s) from the received signal. Multiple stages may be cascaded to improve interference cancellation performance, as described below.

In an embodiment of a cascaded multi-sector interference canceller, a first cancellation signal for a first transmitter is derived by isolating the signal from this transmitter with a spreading code for the transmitter. The first cancellation signal is subtracted from the received signal to obtain an intermediate signal. A second cancellation signal for a second transmitter is derived based on the intermediate signal. If the first transmitter is the desired transmitter, then a signal estimate for the desired transmitter may be obtained by subtracting the second cancellation signal from the received signal. If the desired transmitter is neither the first nor second transmitter, then the signal estimate for the desired transmitter may be obtained by subtracting the second cancellation signal from the intermediate signal. More than two stages may be cascaded, as described below.

The word "exemplary" is used herein to mean "serving as an example, instance, or illustration." Any embodiment or design described herein as "exemplary" is not necessarily to be construed as preferred or advantageous over other embodiments or designs.

The interference cancellation techniques described herein may be used for various communication systems such as CDMA, TDMA, FDMA, orthogonal frequency division multiple access (OFDMA), and single-carrier FDMA (SC-FDMA) systems. A CDMA system may implement one or more CDMA radio access technologies (RATs) such as cdma2000, Wideband-CDMA (W-CDMA), and so on where cdma2000 covers IS-2000, IS-856, and IS-95 standards. A TDMA system may implement a RAT such as GSM. These various RATs and standards are known in the art. W-CDMA and GSM are described in documents from a consortium named "3rd Generation Partnership Project" (3GPP). cdma2000 is described in documents from a consortium named "3rd Generation Partnership Project 2" (3GPP2). 3GPP and 3GPP2 documents are publicly available. An OFDMA system utilizes OFDM to transmit symbols in the frequency domain on orthogonal frequency subbands. An SC-FDMA system transmits symbols in the time domain on orthogonal frequency subbands. For clarity, the techniques are described below for a CDMA system, which may be cdma2000 system or a W-CDMA system.

FIG. 1 is a block diagram of a CDMA system 100 with multiple base stations. For simplicity, FIG. 1 shows only three base stations 110a, 110b and 110c and one wireless device 120. A base station is generally a fixed station that communicates with the wireless devices and may also be called a Node B (3GPP terminology), an access point, or some other terminology. Each base station 110 provides communication coverage for a particular geographic area. The term "cell" can refer to a base station and/or its coverage area depending on the context in which the term is used. To improve system capacity, the base station coverage area may be partitioned into multiple (e.g., three) smaller areas. Each smaller area is served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. The following description assumes that each cell is partitioned into multiple sectors. For simplicity, the term "base station" generically refers to a fixed station for a cell as well as a fixed station for a sector. A serving base station/sector is a base station/sector with which a wireless device communicates.

A wireless device may be fixed or mobile and may also be called a user equipment (UE) (3GPP terminology), a mobile station, a user terminal, or some other terminology. A wireless device may be a cellular phone, a personal digital assistant (PDA), a wireless modem card, and so on. A wireless device may communicate with zero, one, or multiple base stations on the forward link (or downlink) and reverse link (or uplink) at any given moment. In the interest of clarity and brevity, FIG. 1 shows only transmissions on the forward link. Wireless device 120 receives a desired transmission from serving base station 110a via line-of-sight and reflected paths and also receives interfering transmissions from neighbor base stations 110b and 110c via line-of-sight and reflected paths.

Figure 2:
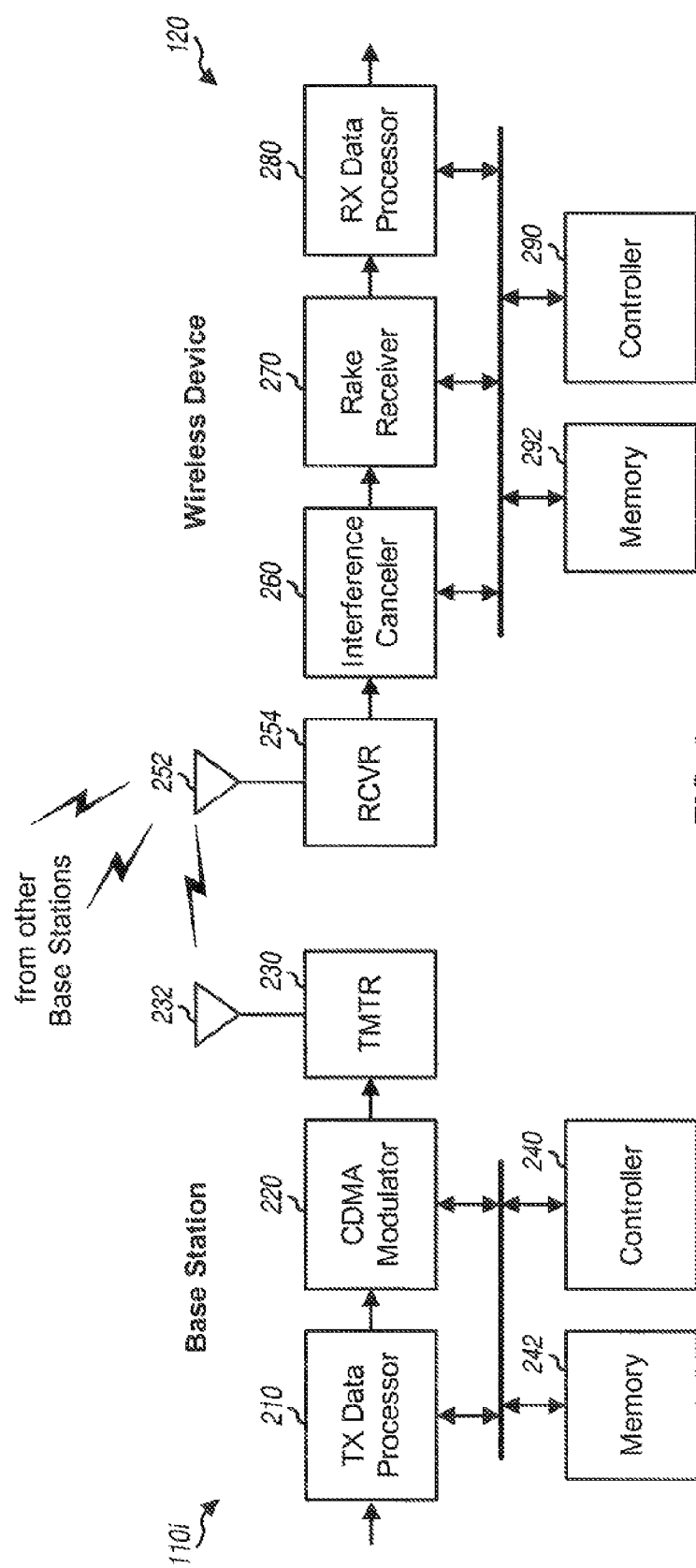
FIG. 2 shows a block diagram of a base station and a wireless device.

FIG. 2 shows a block diagram of a base station 110i and wireless device 120. Base station 110i may be any one of the base stations shown in FIG. 1. In the interest of clarity and brevity, FIG. 2 shows base station 110i having one transmit antenna and wireless device 120 having one receive antenna. In general, base station 110i and wireless device 120 may each be equipped with any number of antennas. In the interest of clarity and brevity, FIG. 1 shows only the processing units for data transmission on the forward link.

At base station 110i, a transmit (TX) data processor 210 receives traffic data for the wireless devices being served, processes (e.g., encodes, interleaves, and symbol maps) the traffic data to generate data symbols, and provides the data symbols to a CDMA modulator 220. As used herein, a data symbol is a modulation symbol for data, a pilot symbol is a modulation symbol for pilot, a modulation symbol is a complex value for a point in a signal constellation (e.g., for M-PSK, M-QAM, and so on), a symbol is a complex value, and pilot is data that is known a priori by both the base stations and the wireless devices. CDMA modulator 220 processes the data symbols and pilot symbols as described below and provides a stream of output chips to a transmitter unit (TMTR) 230. Transmitter unit 230 processes (e.g., converts to analog, amplifies, filters, and frequency upconverts) the output chip stream and generates a forward link signal, which is transmitted from an antenna 232.

At wireless device 120, an antenna 252 receives the forward link signals transmitted by base station 110i as well as other base stations. Antenna 252 provides a received signal to a receiver unit (RCVR) 254. Receiver unit 254 processes (e.g., filters, amplifies, frequency downconverts, and digitizes) the received signal and provides received samples to an interference canceller 260. Interference canceller 260 estimates and suppresses the interference from interfering base stations as described below and provides interference-canceled samples for the serving base station to a rake receiver 270. Antenna 252 may receive the forward link signal from the serving base station via one or more signal paths as shown in FIG. 1, and the received signal may thus include one or more signal instances (or multipaths) for the serving base station. Rake receiver 270 processes all multipaths of interest and provides data symbol estimates, which are estimates of the data symbols sent by the serving base station. Rake receiver 270 may also be replaced with an equalizer or some other types of receiver. A receive (RX) data processor 280 processes (e.g., symbol demaps, deinterleaves, and decodes) the data symbol estimates and provides decoded data. In general, the processing by rake receiver 270 and RX data processor 280 is complementary to the processing by CDMA modulator 220 and TX data processor 210, respectively, at base station 110i.

Controllers 240 and 290 direct operation of various processing units at base station 110i and wireless device 120, respectively. Memories 242 and 292 store data and program codes for base station 110i and wireless device 120, respectively.

For CDMA, multiple orthogonal channels may be obtained with different orthogonal codes. For example, multiple orthogonal traffic channels are obtained with different Walsh codes in cdma2000, and multiple orthogonal physical channels are obtained with different orthogonal variable spreading factor (OVSF) codes in W-CDMA. The orthogonal channels may be used to send different types of data (e.g., traffic data, broadcast data, control data, pilot, and so on) and/or traffic data for different wireless devices. The orthogonal channels are appropriately scaled, combined, and spectrally spread across the entire system bandwidth. The spectral spreading is performed with a spreading code, which is a pseudo-random number (PN) sequence in cdma2000 and a scrambling code in W-CDMA. For cdma2000, the channelization with Walsh codes is called "covering", and the spectral spreading is called "spreading". For W-CDMA, the channelization with OVSF codes is called "spreading", and the spectral spreading is called "scrambling". For clarity, cdma2000 terminology (e.g., traffic channel, covering, spreading, and so on) is used in the following description.

Figure 3:
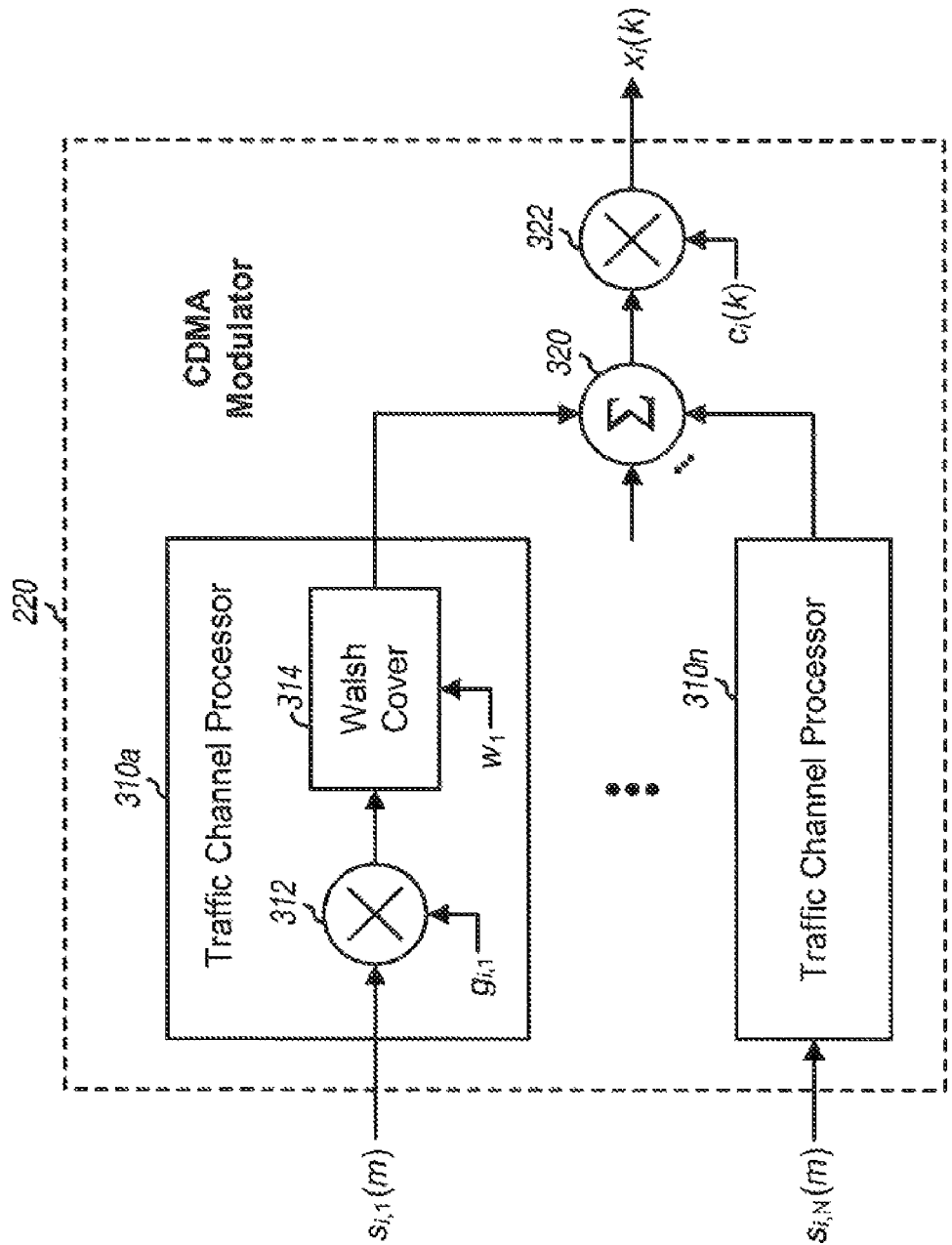
FIG. 3 shows a CDMA modulator at the base station.

FIG. 3 shows a block diagram of CDMA modulator 220 within base station 110i. In the interest of clarity and brevity, the following description assumes that N traffic channels are available for each sector, and each traffic channel is assigned a different Walsh code of length N, where N may be equal to 4, 8, 16, 32, 64 or 128 for cdma2000. In general, orthogonal codes of different lengths may be used for the traffic channels, and N may correspond to the length of the longest orthogonal code.

CDMA modulator 220 includes N traffic channel processors 310a through 310n for the N traffic channels. Within each traffic channel processor 310, a multiplier 312 receives and scales the data symbols for traffic channel n with a gain $g_{i,n}$ for traffic channel n and provides scaled data symbols. The gain $g_{i,n}$ may be set to zero if traffic channel n is not used. A Walsh cover unit 314 channelizes the scaled data symbols with a Walsh code $w_n$ assigned to traffic channel n. Unit 314 performs covering by repeating each scaled data symbol multiple times to generate N replicated symbols and then multiplying the N replicated symbols with the N chips of Walsh code $w_n$ to generate N data chips for that data symbol. A combiner 320 receives and adds the data chips for all N traffic channels. A multiplier 322 multiplies the combined data chips with a spreading code assigned to sector i and generates output chips.

The output chips for sector i may be expressed in discrete time, as follows:

$$x_i(k) = \sum_{n=1}^{N} c_i(k) \cdot w_n(\mod(k, N)) \cdot g_{i,n} \cdot s_{i,n}(\lfloor k/N \rfloor), \quad \text{Eq. (1)}$$

where k is an index for chip period;
n is an index for traffic channel;
i is an index for sector;
$s_{i,n}(\lfloor k/N \rfloor)$ is a data symbol sent in chip period k;
$w_n(\mod(k, N))$ is a Walsh chip for chip period k;
$g_{i,n}$ is the gain for traffic channel n in sector i;
$c_i(k)$ is a spreading code chip for sector i in chip period k; and
$x_i(k)$ is an output chip for sector i in chip period k.

Each data symbol is sent in N chip periods, and data symbol $s_{i,n}(m)$ for symbol period m is sent in chip periods k=N·m through N·m+N−1. Hence, $m=\lfloor k/N \rfloor$ and $s_{i,n}(m)=s_{i,n}(\lfloor k/N \rfloor)$, where "$\lfloor x \rfloor$" denotes a floor operator. The data symbols, Walsh chips, and spreading code chips are assumed to have unit magnitude for all chip periods k, symbol periods m, and traffic channels n, or $|s_{i,n}(m)|=|w_n w(\mod(k, N))|=|c_i(k)|=1$ for $\forall k,m,n$. The spreading codes for different sectors are uncorrelated, with $E\{c_i(k) \cdot c_j^*(k+\kappa)\}=\delta(\kappa) \cdot \delta(i, j)$, which means that the expected value between the spreading codes for sectors i and j is equal to one only if κ=0 and i=j. Different sectors are assigned different shifted versions of the same PN sequence in cdma2000, in which case the spreading codes for different sectors are uncorrelated over a range of chip offsets.

Equation (1) may be expressed in matrix form, as follows:

$$x_i(m) = C_i(m) \cdot W \cdot G_i \cdot s_i(m), \quad \text{Eq. (2)}$$

where $s_i(m)=[s_{i,1}(m)\ s_{i,2}(m) \ldots s_{i,N}(m)]^T$ is an N×1 vector containing N data symbols to be sent on the N traffic channels in symbol period m, where "T" denotes a transpose;
$G_i$ is an N×N diagonal matrix containing the gains for the N traffic channels, or diag $(G_i)=\{g_{i,1}, g_{i,2}, \ldots, g_{i,N}\}$;
W is an N×N Walsh matrix containing N Walsh codes in N columns;
$C_i(m)$ is an N×N diagonal matrix containing N spreading code chips for N chip periods in symbol period m, or diag $(C_i(m))=\{c_i(N \cdot m), c_i(N \cdot m+1), \ldots, c_i(N \cdot m+N−1)\}$; and
$x_i(m)=[x_i(N \cdot m) x_i(N \cdot m+1) \ldots x_i(N \cdot m+N−1)]^T$ is an N×1 vector containing N output chips for sector i in symbol period m.

A diagonal matrix contains possible non-zero values along the diagonal and zeros elsewhere. If the traffic channels have different Walsh code lengths, then N is equal to the longest Walsh code length for all traffic channels, and each shorter Walsh code is repeated in matrix W.

Wireless device 120 receives the forward link signals from base station 110i and other base stations. The received samples from receiver unit 254 may be expressed as:

$$r(m) = \sum_i \alpha_i \cdot x_i(m) + n(m), \quad \text{Eq. (3)}$$

where $\alpha_i$ is a channel gain for sector i;
n(m) is an N×1 vector of noise and interference not included in $x_i(m)$; and
r(m) is an N×1 vector containing N received samples for symbol period m.

Equation (3) assumes that all sectors are synchronized and that there is a single signal path (i.e., no multipath) for each sector. For simplicity, the noise and interference in n(m) may be assumed to be additive white Gaussian noise (AWGN) with a zero mean vector and a covariance matrix of $N_0 \cdot I$, where $N_0$ is the variance of the noise and interference, and I is the identity matrix with ones along the diagonal and zeros elsewhere.

In equation (3), r(m) is a received vector for one symbol period. The received vectors for different symbol periods are uncorrelated due to the use of spreading codes that are temporally uncorrelated. Hence, there is no dependence across different symbol periods and, for clarity, index m is omitted in the following description.

Wireless device 120 may derive estimates of the data symbols transmitted by a given sector j on traffic channel n by (1) despreading the received samples with the spreading code used by sector j and (2) decovering the despread samples with the Walsh code for traffic channel n, as follows:

$$\check{s}_{j,n} = w_n^T \cdot C_j^H \cdot r, \qquad \text{Eq. (4)}$$

where $C_j$ is an N×N diagonal matrix containing the spreading code chips for sector j, where "H" denotes a conjugate transpose;

$w_n$ is an N×1 vector containing the Walsh code for the desired traffic channel n;

$s_{j,n}$ is a data symbol sent by sector j on traffic channel n; and $\check{s}_{j,n}$ is an estimate of $s_{j,n}$ without interference cancellation.

In one aspect, to cancel the interference from an interfering sector l, wireless device 120 despreads the received samples with the spreading code used by sector l and then decovers the despread samples, as follows:

$$u_l = W^T \cdot C_l^H \cdot r, \qquad \text{Eq. (5)}$$

where $u_l$ is an N×1 vector containing N received symbols for N Walsh bins for sector.

The multiplication by $C_l^H$ despreads the received samples for sector l, and the multiplication by $W^T$ generates received symbols for the N Walsh bins. The N Walsh bins are for N traffic channels if these traffic channels are assigned N different Walsh codes of length N. The N Walsh bins may be viewed as corresponding to N orthogonal channels obtained via the decovering with $W^T$.

A covariance matrix $\Lambda_l$ for vector $u_l$ may be expressed as:

$$\Lambda_\ell = E\{\underline{u}_\ell \cdot \underline{u}_\ell^H\} \qquad \text{Eq. (6)}$$

$$= N^2 \cdot |\alpha_\ell|^2 \cdot \underline{G}_\ell^2 + N \cdot \left( \sum_{i \neq \ell} \sum_{n=1}^N |\alpha_i|^2 \cdot g_{i,n}^2 + N_0 \right) \cdot I,$$

$$= q_\ell \cdot \underline{G}_\ell^2 + \sigma^2 \cdot I,$$

where $q_l = N^2 \cdot |\alpha_l|^2$ is a channel power gain for sector l; and $$\sigma^2 = N \cdot \left( \sum_{i \neq \ell} \sum_{n=1}^N |\alpha_i|^2 \cdot g_{i,n}^2 + N_0 \right)$$

is a total power gain for all other sectors.

The covariance matrix $\Lambda_l$ may be given as diag $(\Lambda_l) = \{\lambda_{l,1}, \lambda_{l,2}, \ldots, \lambda_{l,N}\}$ where $$\lambda_{\ell,n} = N^2 \cdot |\alpha_\ell|^2 \cdot g_{\ell,n}^2 + N \cdot \left( \sum_{i \neq \ell} \sum_{n=1}^N |\alpha_i|^2 \cdot g_{i,n}^2 + N_0 \right),$$

for $n = 1, \ldots, N$.

The diagonal elements of $\Lambda_l$ are measured powers (or eigenvalues) for the N Walsh bins. $\Lambda_l$ is equi-diagonal if all N diagonal elements are equal, or $\lambda_{l,n} = \lambda_l \ \forall n$.

As explained above, the wireless device 120 derives symbol estimates either linearly or nonlinearly. Where a linear function is applied, wireless device 120 may derive symbol estimates for traffic channel n of serving sector j based on various techniques such as a linear minimum mean square error (LMMSE) technique, a least squares (LS) technique, and so on. Symbol estimates for traffic channel n of sector j may be derived based on the LMMSE technique, as follows:

$$\hat{s}_{j,n} = E(s_{j,n}^* \cdot \underline{u}_\ell \mid \underline{C}_j, \underline{C}_\ell)^H \cdot \Omega_\ell^{-1} \cdot \underline{u}_\ell, \qquad \text{Eq. (7)}$$

$$= E\left( s_{j,n}^* \cdot \left( \frac{\underline{W}^T \cdot \underline{C}_\ell^H \sum_i \alpha_i \cdot \underline{C}_i \cdot \underline{W} \cdot}{\underline{G}_i \cdot \underline{s}_i + \underline{W}^T \cdot \underline{C}_\ell^H \cdot \underline{n}} \right) \bigg| \underline{C}_j, \underline{C}_\ell \right)^H \cdot \Delta_\ell^{-1} \cdot \underline{u}_\ell,$$

$$= \alpha_j^* \cdot g_{j,n} \cdot \underline{w}_n^T \cdot \underline{C}_j^H \cdot \underline{C}_\ell \cdot \underline{W} \cdot \Delta_\ell^{-1} \cdot \underline{u}_\ell.$$

where $\hat{s}_{j,n}$ is an LMMSE estimate of $s_{j,n}$.

The LMMSE symbol estimation in equation (7) may be combined with equation (5) and then broken into smaller equations, as follows:

$$\underline{r}_\ell = \underline{C}_\ell \cdot \underline{W} \cdot \Delta_\ell^{-1} \cdot \underline{W}^T \cdot \underline{C}_\ell^H \cdot \underline{r}, \qquad \text{Eq. (8)}$$

$$\hat{s}_{j,n} = \underline{w}_n^T \cdot \underline{C}_j^H \cdot \underline{r}_\ell, \text{ and} \qquad \text{Eq. (9)}$$

$$\hat{\hat{s}}_{j,n} = \alpha_j^* \cdot g_{j,n} \cdot \hat{s}_{j,n}, \qquad \text{Eq. (10)}$$

where $r_l$ is an N×1 vector containing N interference-canceled samples having the signal component for sector l suppressed;

$\Lambda_l^{-1}$ is an N×N diagonal matrix given as diag $(\Lambda_l^{-1}) = \{\lambda_{l,1}^{-1}, \lambda_{l,2}^{-1}, \ldots, \lambda_{l,N}^{-1}\}$;

$\hat{s}_{j,n}$ is an unweighted estimate of $s_{j,n}$; and $\hat{\hat{s}}_{j,n}$ is a weighted estimate of $s_{j,n}$.

Equation (8) represents interference cancellation for one interfering sector l. Equation (8) may be considered as including both linear operations (e.g., the transformations by $W^T$ and W) and non-linear operations (e.g., the despreading with $C_l^H$ and spreading with $C_l$). Equation (8) may thus be viewed as performing quasi-linear interference cancellation (QLIC) because the waveform is first multiplied by a time varying function (e.g. the despreading code), which is the same function as a component of the waveform (i.e., the multiplication term is itself a function of the received waveform). Vector $r_l$ contains samples having the interference from sector l suppressed. Equation (9) indicates that the remaining LMMSE symbol estimation for $s_{j,n}$ includes simple despread and decover operations that are conventionally done by a CDMA receiver, as shown in equation (4). In particular, vector $r_l$ is despread with the spreading code for the desired sector j and then decovered with the Walsh code for the desired traffic channel n. Equation (10) shows the LMMSE scaling to obtain the weighted estimate for subsequent decoding.

As shown in equation (6), the diagonal elements of $\Lambda_l$ are determined in part by the gain matrix $G_l$ for interfering sector l. If the gains for all N traffic channels in sector l are equal (i.e., $g_{l,n} = g_l$ for $]n$), then $G_l = g_l \cdot I$ and $\Lambda_l = \eta \cdot I$, where $\eta$ is an overall power gain. In this case, $$\underline{r}_\ell = \frac{1}{\eta} \underline{r}$$

and the unweighted symbol estimate $\hat{s}_{j,n}$ from equation (9) is equal to the symbol estimate $\check{s}_{j,n}$ from equation (4) without interference cancellation. Interference cancellation is achieved when the gains in matrix $G_l$ are not equal, so that traffic channels with larger gains are attenuated more by the multiplication with the inverted covariance matrix $\Lambda_l^{-1}$ in equation (8).

Figure 4A:
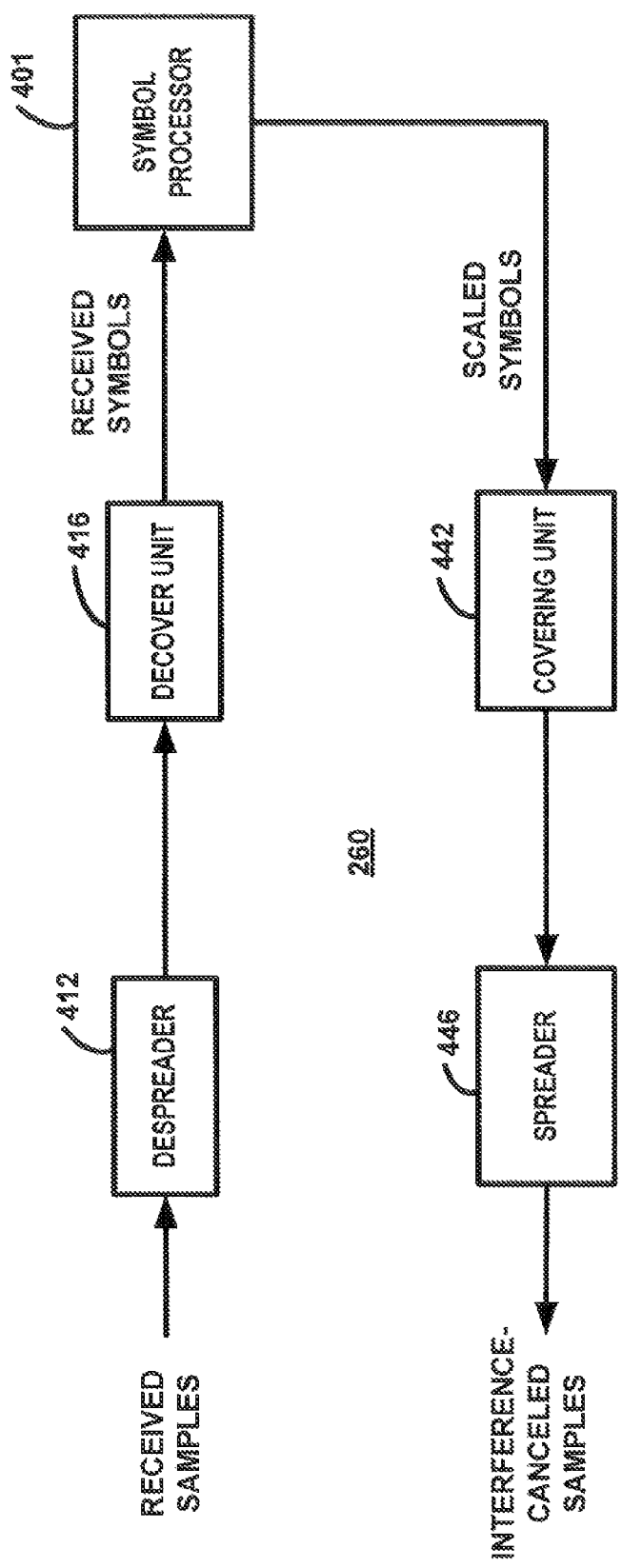
FIG. 4A is a block diagram of a single-sector interference canceller.

FIG. 4A is a block diagram of an example of an interference canceller 260. The interference canceller 260 may be implemented in any combination of hardware software and/ or firmware. Received samples are received from at least one transmitter transmitting desired signals as well as from one or more interfering transmitters. A despreader 412 despreads the received samples to isolate the samples from the interfering transmitter. A decover unit 416 decovers the resulting input samples to generate received symbols. In a W-CDMA implementation, the despreading may be referred to as "descrambling" and the decovering may be referred to as "despreading". The received symbols are processed by a symbol processor 401 to minimize, eliminate, or at least reduce, the interference due the samples received from the interfering transmitter. The symbol processor 401 applies a function to the received symbols to scale received symbols with multiple gains where the function maybe linear or nonlinear. The resulting scaled symbols are covered by the covering unit 442 and spread by the spreader 446 to generate interference cancelled samples.

Figure 4B:
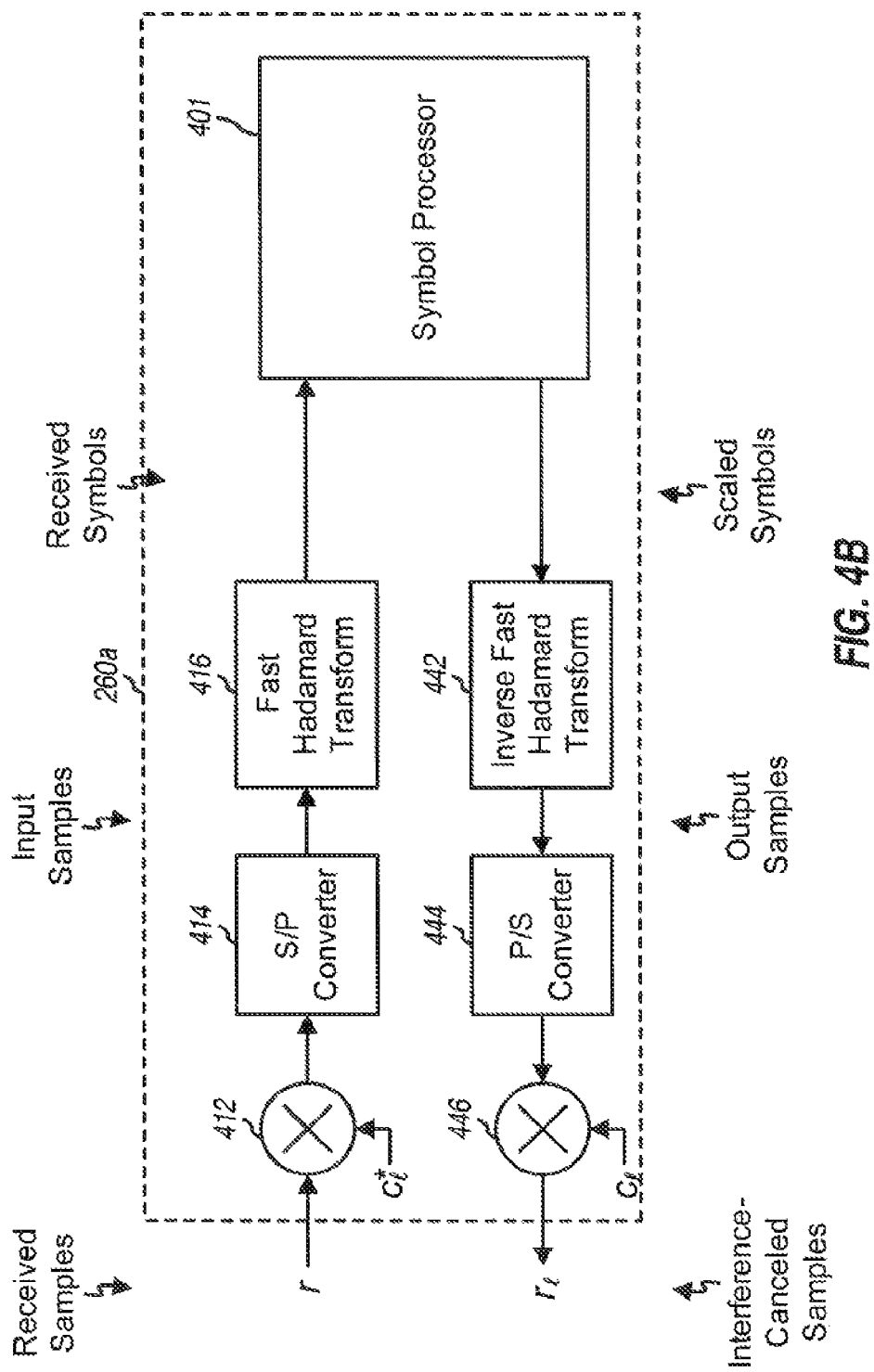
FIG. 4B shows an exemplary implementation of a single-sector interference.

FIG. 4B shows a block diagram of a single-sector interference canceller 260a, which is an implementation of interference canceller 260. For the example in FIG. 4B multiplier 412 performs the functions of the despreader 412 and a transform unit 416 performs at least some of the functions of the decover unit 416. The multiplier 412 multiplies the received samples r with a complex-conjugated spreading code $c_l^*$ for sector 1 and provides input samples. A serial-to-parallel (S/P) converter 414 forms a vector of N input samples for each symbol period and provides the N input samples in parallel. The transform unit 416, such as a fast Hadamard transform (FHT) unit 416, performs an N-point FHT on the N input samples for each symbol period and provides N received symbols for N Walsh bins.

The symbol processor 401 generates scaled symbols based on the received symbols provided by the transform unit 416. As discussed below in further detail, the scaling may be linear scaling or non-linear scaling. Accordingly, the symbol processor weights the received symbols in accordance with a function where the function may be linear or nonlinear.

An inverse transform unit 442 performs a transform which is the inverse of the transform applied by the transform unit 416. In the example of FIG. 4A the inverse transform unit is an inverse FHT (IFHT) unit 442 that performs an N-point IFHT on the N scaled symbols for each symbol period and provides N output samples for that symbol period. A parallel-to-serial (P/S) converter 444 serializes the N output samples for each symbol period. A multiplier 446 multiplies the output samples with the spreading code for sector l and provides the interference-canceled samples $r_l$. Accordingly, the inverse transform unit 442 performs at least some of the functions of the covering unit 442 and the multiplier 446 is a spreader 446 in the example discussed withy reference to FIG. 4B. Therefore, multiplier 412 performs despreading for sector l, which is multiplication with $C_l^H$ in equation (8). Serial-to-parallel converter 414 vectorizes the input samples for each symbol period. The transform unit (FHT unit) 416 performs decovering for the N traffic channels, which is multiplication with $W^T$ in equation (8).

Figure 4C:
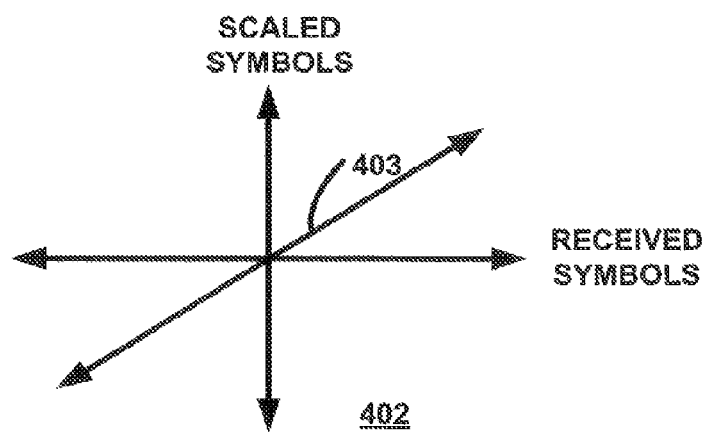
FIG. 4C is a graphical representation of a linear scaling function performed by the symbol processor.

FIG. 4C is a graphical representation 402 of a linear scaling function 403 performed by the symbol processor 401. As illustrated in FIG. 4C, the only parameter that can be varied with a linear function is the slope of the line representing the relationship between the scaled symbols and the received symbols.

Figure 4D:
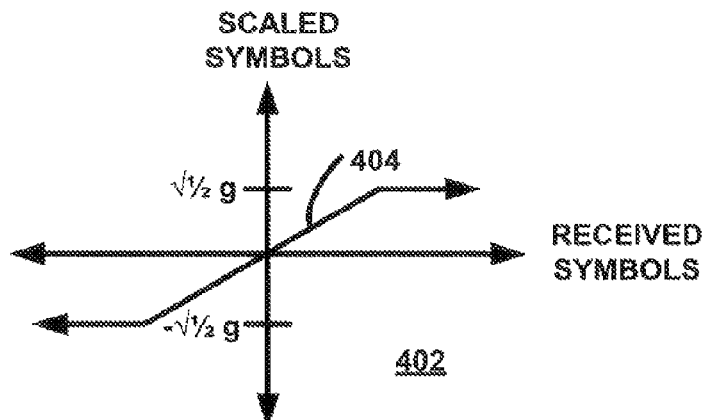
FIG. 4D is a graphical representation of a first exemplary non-linear scaling function performed by the symbol processor.

FIG. 4D is a graphical representation 402 of a first exemplary non-linear scaling function 404 performed by the symbol processor 401. The nonlinear function 404 illustrated in FIG. 4D is a clipping function that includes a linear portion between an estimated maximum gain $$\sqrt{\frac{1}{2}}(g)$$

and an estimated minimum gain $$\sqrt{\frac{1}{2}}(-g).$$

The function is clipped such that the scaled symbols are not greater than the square root of ½ times the estimated maximum gain and are not less than the square root of ½ times estimated minimum gain. The nonlinear scaling functions of FIG. 4C and FIG. 4D operate independently on the real and the imaginary components of the symbols.

Figure 4E:
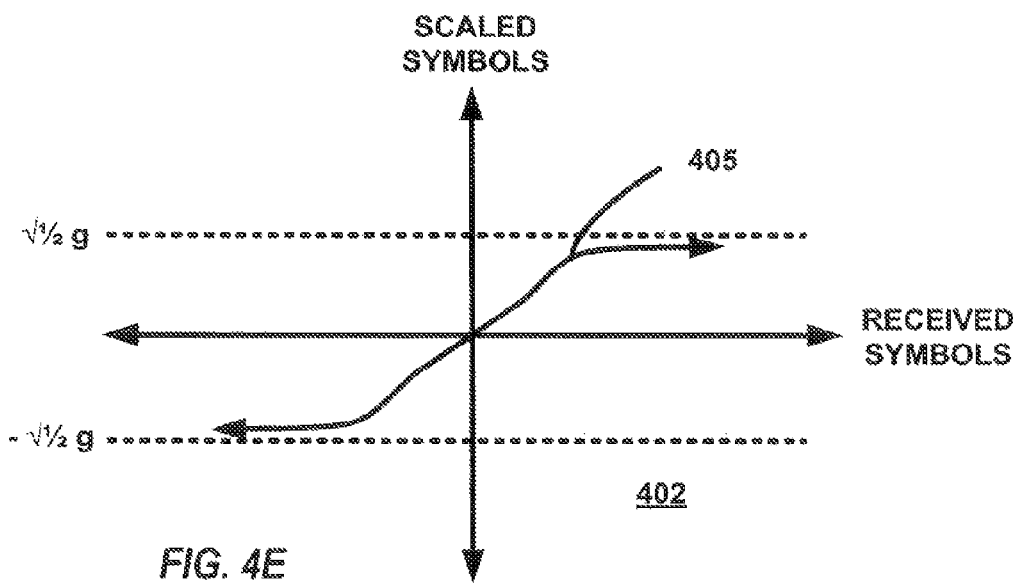
FIG. 4E is a graphical representation of a second exemplary nonlinear scaling function performed by the symbol processor.

FIG. 4E is a graphical representation 402 of a second exemplary nonlinear scaling function 405 performed by the symbol processor 401. The nonlinear function 405 illustrated in FIG. 4E is a curve that that is asymptotic with the estimated maximum gain $$\sqrt{\frac{1}{2}}(g)$$

and the estimated minimum gain $$\sqrt{\frac{1}{2}}(-g).$$

Figure 4F:
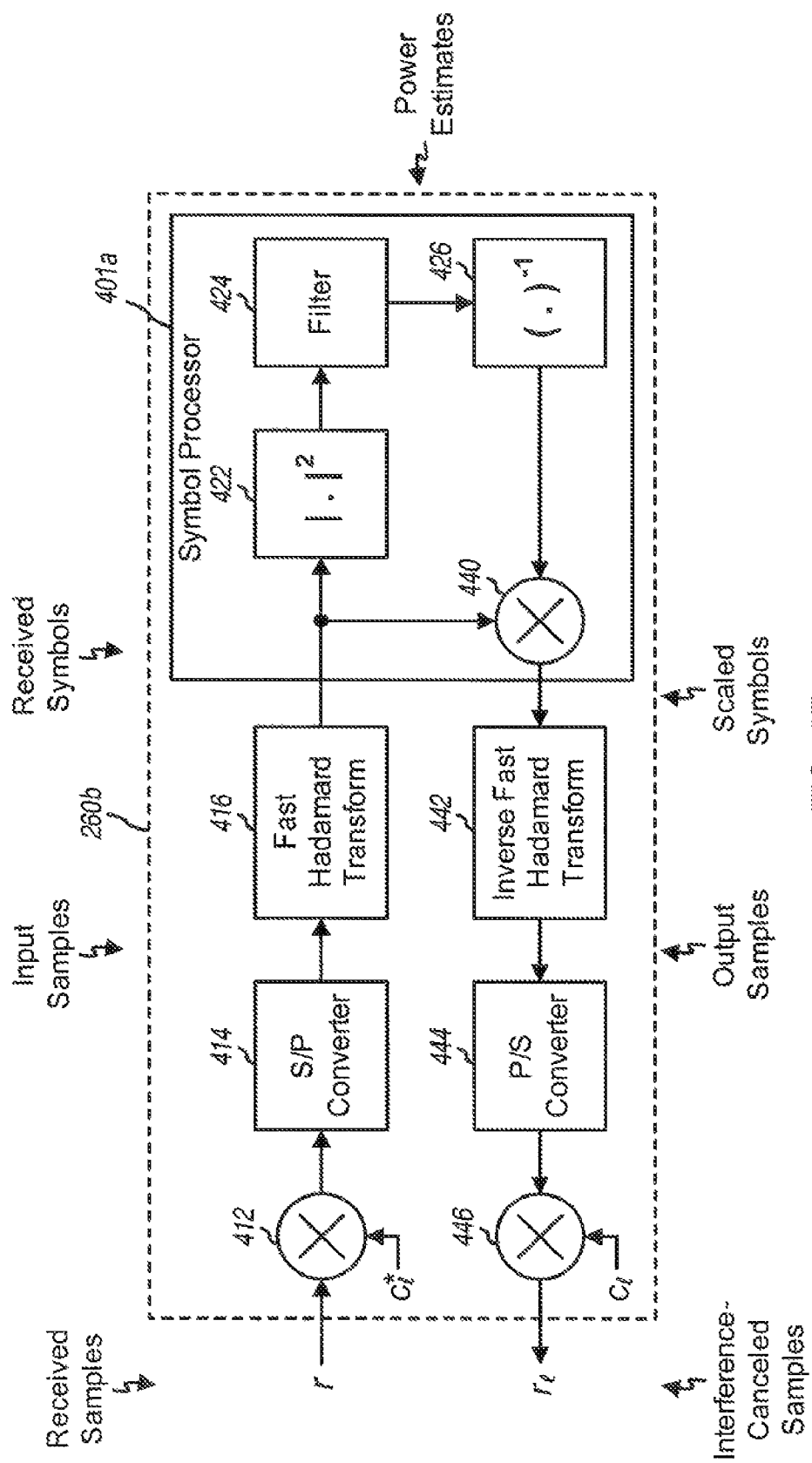
FIG. 4F shows a block diagram of a single-sector interference canceller where the symbol processor applies a linear function to scale the received symbols.

FIG. 4F shows a block diagram of a single-sector interference canceller 260b, which is an embodiment of interference canceller 260 where the symbol processor applies a linear function to scale the received symbols and to generate the scaled the symbols. As described above, the fast Hadamard transform (FHT) unit 416 performs an N-point FHT on the N input samples for each symbol period and provides N received symbols for N Walsh bins.

A unit 422 computes the squared magnitude of each received symbol from the FHT unit 416. A filter 424 averages the squared magnitude of the received symbols for each Walsh bin and provides a power estimate $\hat{\lambda}_{l,n}$ for that Walsh bin. Filter 424 provides an estimate of the diagonal elements of $\Lambda_l$. Filter 424 may be implemented with a finite impulse response (FIR) filter, an infinite impulse response (IIR) filter, or some other type of filter. Examples of suitable time constants for the filter 424 include time constants of 32, 64, 128 symbol periods. Other time constants may be used in some circumstances. A unit 426 computes the inverse of the power estimate for each Walsh bin. A multiplier 440 obtains N received symbols for the N Walsh bins in each symbol period, multiplies the received symbol for each Walsh bin with the inverse power estimate for that Walsh bin, and provides N scaled symbols for the N Walsh bins. Units 422, 424, 426 and 440 perform processing on a per Walsh bin basis.

As described above, the IFHT unit 442 performs an N-point IFHT on the N scaled symbols for each symbol period and provides N output samples for that symbol period. The parallel-to-serial (P/S) converter 444 serializes the N output samples for each symbol period. And the multiplier 446 multiplies the output samples with the spreading code for sector l and provides the interference-canceled samples $r_l$.

The FHT unit 416 efficiently projects the vectorized samples into eigenmodes (or orthogonal channels) using Walsh codes and diagonalizes the covariance matrix $\Lambda_l$. Unit 422, filter 424, and unit 426 derive an estimate of $\Lambda_l^{-1}$. Multiplier 440 scales the N Walsh bins based on the inverses of the power estimates for these Walsh bins. Accordingly, Walsh bins with larger powers are attenuated more, which reduces the interference contribution from these Walsh bins. Multiplier 440 performs the multiplication with $\Lambda_l^{-1}$ in equation (8). IFHT unit 442 performs covering for the N Walsh bins, which is multiplication with W in equation (8). Multiplier 446 performs spreading (or respreading) for sector l, which is multiplication with $C_l$ in equation (8). The despreading by multiplier 412 and the spreading by multiplier 446 may be considered as non-linear operations because they are directly dependent upon a component of the received waveform. The decorrelation operations by units 416 through 442 for the LMMSE technique are linear operations for the symbol processor 401a in FIG. 4F. An example of a relationship between the received symbols and the scaled symbols for the symbol processor 401a is shown in FIG. 4C.

Figure 4G:
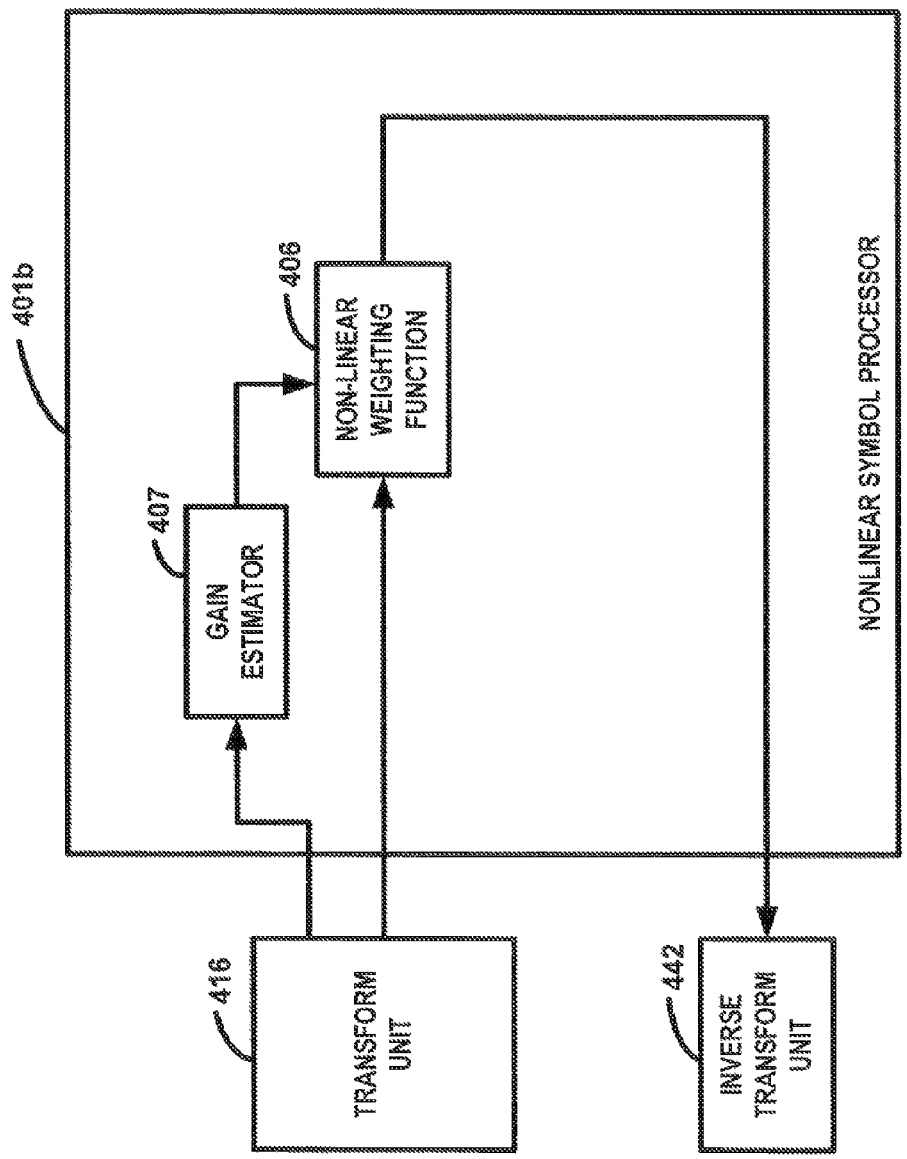
FIG. 4G is a block diagram of the signal processor connected to the transform unit and the inverse transform unit where the signal processor performs a nonlinear process.

FIG. 4G is a block diagram of the signal processor 401b connected to the transform unit and the inverse transform unit where the signal processor 401b performs nonlinear process. An example of a suitable nonlinear function that is performed by the symbol processor 401b in FIG. 4G is a clipping function. A graphical representation of an exemplary clipping function is shown in FIG. 4D. Accordingly, a non-linear weighting function 406 applies a clipping function to received symbols provided by the transform unit 416. The estimated maximum gain $$\sqrt{\frac{1}{2}}(g)$$

and the estimated minimum gain $$\sqrt{\frac{1}{2}}(-g)$$

are generated by a gain estimator 407. An example of a suitable implementation of the symbol processor 401b includes running software and/or firmware code on a processor to perform the functional blocks of the gain estimator 407 and the nonlinear weighting function 406. The functional blocks, however, may be implemented using any combination of hardware software and/or firmware. Further, the various functions and operations of the blocks described with reference to the symbol processor 401b may be implemented in any number of devices, circuits, or elements. Two or more of the functional blocks may be integrated in a single device and the functions described as performed in any single device may be implemented over several devices.

In one aspect, the gain estimator 407 is implemented with a magnitude calculator and a low pass filter. Accordingly, the magnitude of the output of 416 can be calculated and the resulting magnitude filtered by a low pass filter to reduce noise. Other techniques may be used to estimate the gain. For example, the gain, as defined in EQ 2, may be determined by obtaining a corresponding element on the diagonal of lambda as defined in EQ 6, low pass filtering the result to reduce noise and subtracting an estimate of the noise power, $\sigma^2$, and then taking the square root.

Figure 4H:
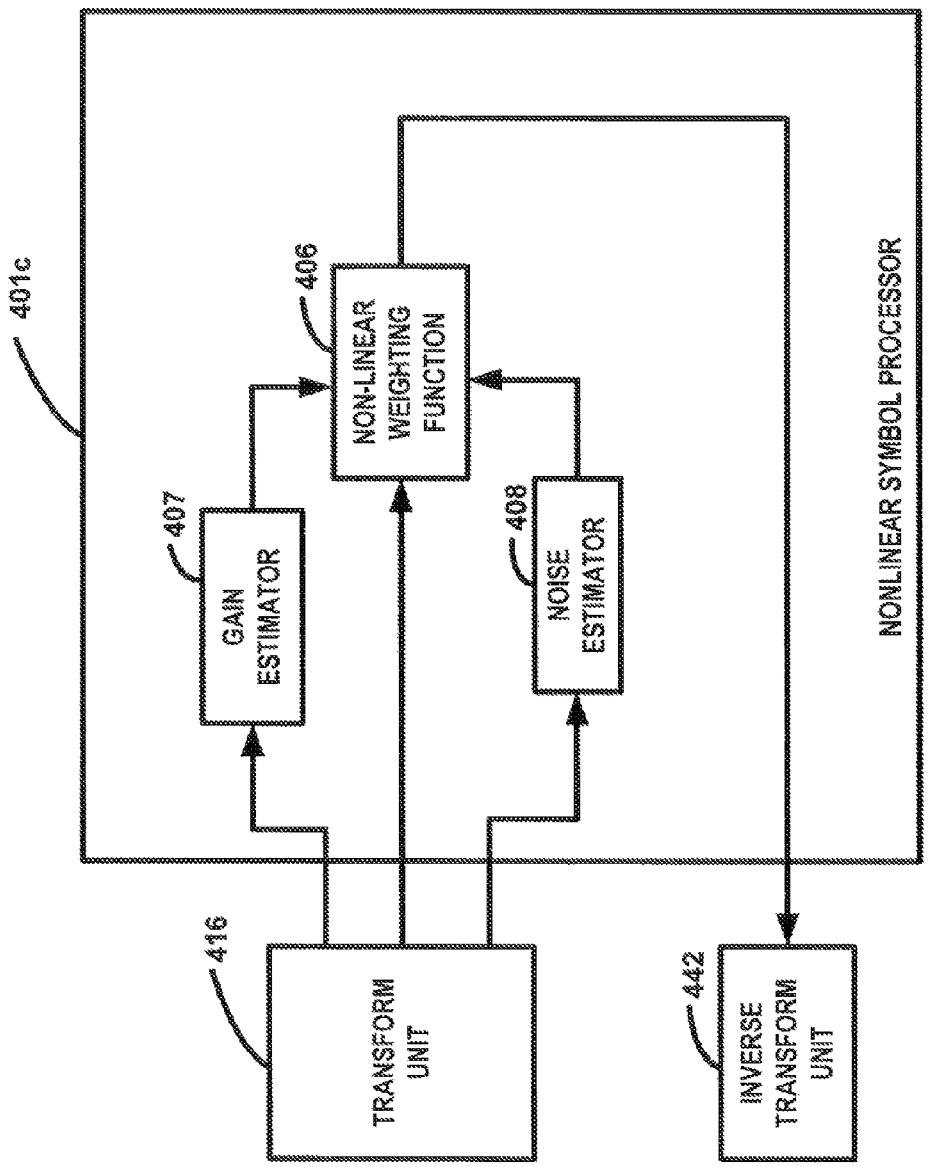
FIG. 4H is a block diagram of the signal processor connected to the transform unit and the inverse transform unit where the signal processor performs another nonlinear process.

FIG. 4H is a block diagram of the signal processor 401c connected to the transform unit and the inverse transform unit where the signal processor 401c performs another nonlinear process. An example of a suitable nonlinear function that is performed by the symbol processor 401c in FIG. 4H is a continuous curve that is asymptotic with the maximum and minimum gains. A graphical representation of an example of such a continuous curve is shown in FIG. 4E. Accordingly, a non-linear weighting function 406 applies a weighting function to received symbols provided by the transform unit 416. The estimated maximum gain $$\sqrt{\frac{1}{2}}(g)$$

and the estimated minimum gain $$\sqrt{\frac{1}{2}}(-g)$$

are generated by a gain estimator 407 and a noise estimator provides an estimate of the noise.

An example of a suitable implementation of the noise estimator 408 includes processing Walsh code 64 ($W_{64}$) provided by the transform 416. As is known, Walsh code 64 is transmitted without data and, therefore, will include only noise when received. In some circumstances, the output of the noise estimator may be low pass filtered to reduce variance of the estimate.

In one aspect, the nonlinear weighting function 406 of FIG. 4H is configured to perform the following function:

$$\hat{s} = \sqrt{\frac{1}{2}} g\left(\tanh\left(\text{real}\left(\frac{g}{\sigma^2}\breve{s}\right)\right) + i\tanh\left(\text{imag}\left(\frac{g}{\sigma^2}\breve{s}\right)\right)\right) \quad \text{Eq. (11)}$$

where
$\breve{s}$ is the received symbol;
$\hat{s}$ is an estimate of a transmitted symbol corresponding to the received symbol;
g is a gain of the transmitted symbol applied at a transmitter; and
$\sigma^2$ is a noise power on the received symbol.

Accordingly, the nonlinear weighting function 496 receives the gain (g) estimated by the gain estimator 407, the noise ($\sigma^2$) estimated by the noise estimator 408 and the received symbols ($\breve{s}$) rom the transform unit 416. Applying the function of Eq. (12) to the data to generate the estimate of transmitted symbol (ŝ) corresponding to the received symbols (š).

An example of a suitable implementation of the symbol processor 401c includes running software and/or firmware code on a processor to perform the functional blocks of the gain estimator 407, the noise generator 408, and the nonlinear weighting function 406. The functional blocks, however, may be implemented using any combination of hardware software and/or firmware. Further, the various functions and operations of the blocks described with reference to the symbol processor 401c may be implemented in any number of devices, circuits, or elements. Two or more of the functional blocks may be integrated in a single device and the functions described as performed in any single device may be implemented over several devices.

Figure 5:
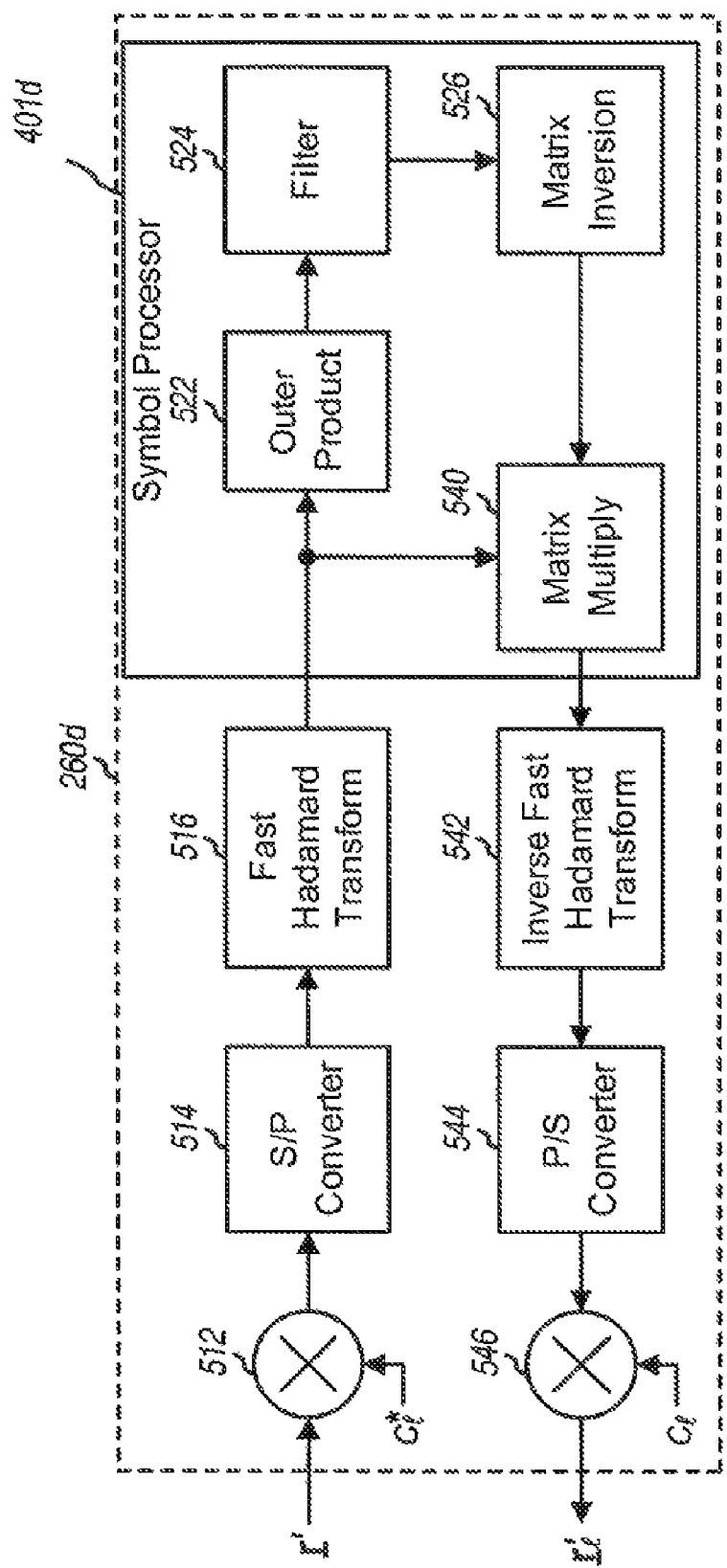
FIG. 5 shows a single-sector interference canceller for multiple signal paths.

FIG. 5 shows a block diagram of a single-sector interference canceller 260d, which is another example of an interference canceller applying a linear weighting (scaling) function. An example of a suitable use for interference canceller 260d includes suppression of interference from multiple signal paths for sector 1. These multiple signal paths may be (1) multipaths in a single received signal from a single receive antenna, (2) multiple received signals from multiple receive antennas, or (3) multipaths in multiple received signals.

Within interference canceller 260d, in each chip period, a multiplier 512 receives a vector r' containing P received samples for P signal paths, multiplies the received sample in each vector location with the complex-conjugated spreading code $c_l^*$ for sector 1, and provides P input samples for P locations in r'. A serial-to-parallel converter 514 forms an N×P matrix of input samples in each symbol period. This matrix contains P columns for the P signal paths, with each column containing N input samples for one signal path. An FHT unit 516 performs an N-point FHT on each column of the N×P input sample matrix and provides an N×P matrix of received symbols. This received symbol matrix contains P columns for the P signal paths, with each column containing N received symbols for the N Walsh bins in one signal path.

Units 522 through 540 perform matrix-vector multiply of the received symbols on a per Walsh bin basis. Unit 522 forms N vectors with the N rows of the N×P received symbol matrix, with each vector containing P received symbols for the P signal paths for one Walsh bin. Unit 522 then computes an outer product of the received symbol vector for each Walsh bin and provides a P×P correlation matrix for that Walsh bin. Filter 524 filters the N correlation matrices for the N Walsh bins over multiple symbol periods and provides N P×P covariance matrices for the N Walsh bins. A unit 526 inverts each P×P covariance matrix. Multiplier 540 multiplies each row of the N×P received symbol matrix (which is a 1×P row vector for one Walsh bin) with the P×P inverted covariance matrix for that Walsh bin and provides a corresponding 1×P row vector of resultant symbols. Multiplier 540 provides an N×P matrix of resultant symbols in each symbol period.

An IFHT unit 542 performs an N-point IFHT on each column of the N×P scaled symbol matrix and provides an N×P matrix of output samples for that symbol period. A parallel-to-serial converter 544 serializes the N output samples for each symbol path and provides a vector of P output samples for the P signal paths in each chip period. A multiplier 546 multiplies the output samples for each signal path with the spreading code for sector 1 and provides the interference-canceled sample for that signal path. In each chip period, multiplier 546 provides a vector $r'_l$ containing P interference-canceled samples for the P signal paths.

FIG. 4A-FIG. 4H and FIG. 5 show interference cancellation for one interfering sector 1. Interference from multiple sectors may also be estimated and canceled prior to demodulating a desired sector. A cancellation term $e_l$ for each sector 1 may be defined as:

$$e_l = r - \frac{1}{tr(\Lambda_l^{-1})} \cdot r_l = r - \tilde{r}_l,$$  Eq. (12)

where $1/tr(\Lambda_l^{-1})$ is a scaling factor for sector 1; and
$\tilde{r}_l$ is a scaled version of $r_l$.

Vector $e_l$ contains the signal component for sector 1 as well as distortion noise due to the $\sigma^2$ term in equation (6). Vector $e_l$ represents an interference component for other sectors and is equal to zero if $\Lambda_l$ is equi-diagonal. Vectors $e_l$ for different sectors are uncorrelated due to the use of different spreading codes by different sectors. Vector $e_l$ for an interfering sector 1 is also uncorrelated with transmitted vector $x_j$ for a desired sector j, again due to the use of different spreading codes. The scaling factor $1/tr(\Lambda_l^{-1})$ results in optimal weighting of the interference contributions from different interfering sectors.

An estimate of the transmitted vector $x_j$ for sector j may be expressed as:

$$\hat{x}_j = r - \sum_{l \neq j} e_l = r - e_{os,j},$$  Eq. (13)

where $\hat{x}_j$ is an estimate of $x_j$, and $e_{os,j}$ is the sum of the cancellation signals from the other sectors. Vector $\hat{x}_j$ includes the signal component from sector j and has the interference components from other sectors canceled. Equations (12) and (13) maximize the signal-to-noise-and-interference ratio (SINR) for the estimation of $\hat{x}_j$ under the assumption that the data symbols from each sector are independent and zero mean. The transmitted vector $\hat{x}_j$ may be despread and decovered to obtain data symbol estimates for a desired traffic channel n from sector j, as follows:

$$\hat{s}_{j,n} = w_n^T \cdot C_j^H \cdot \hat{x}_j.$$  Eq. (14)

Figure 6:
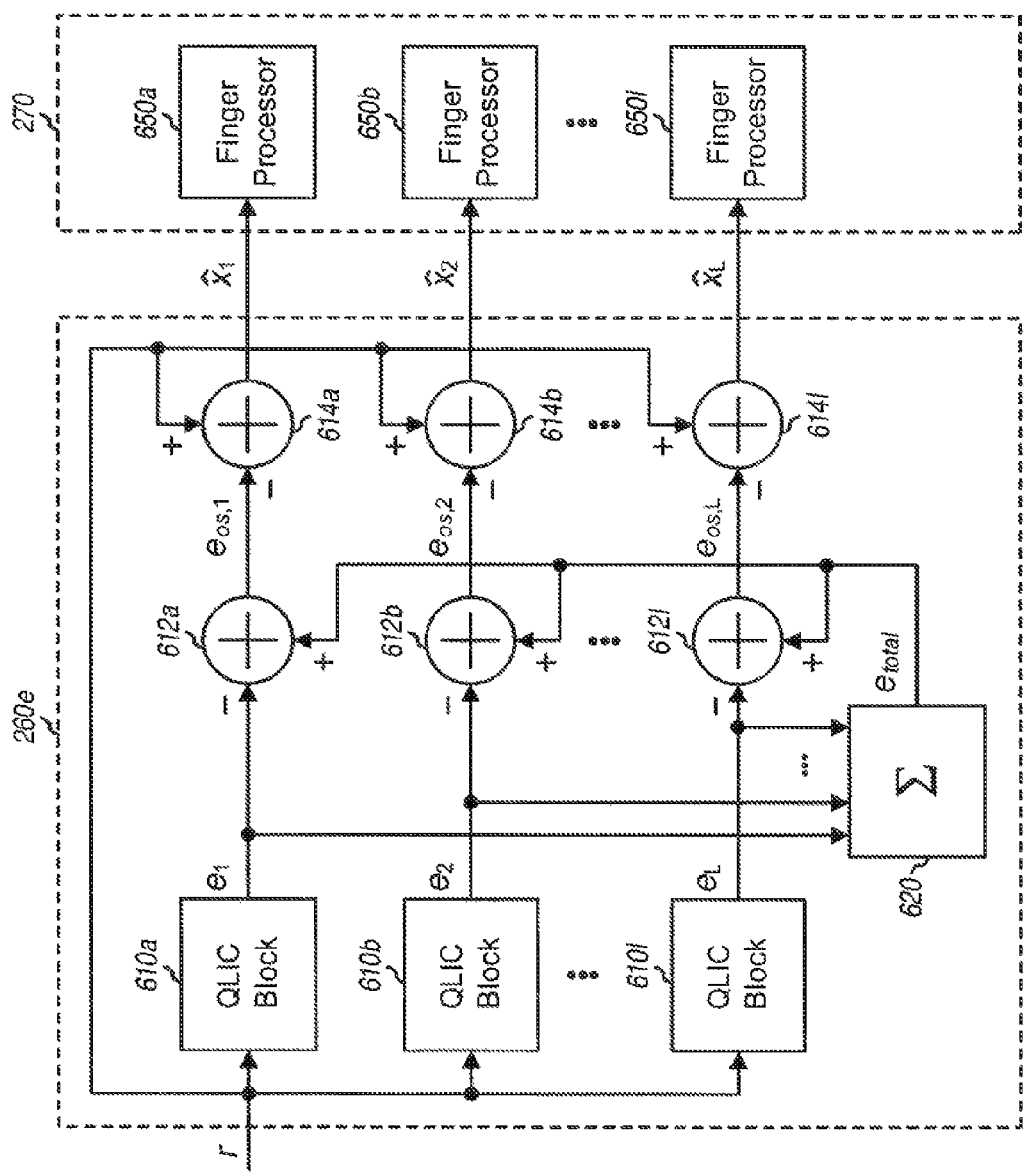
FIG. 6 shows a parallel multi-sector interference canceller.

FIG. 6 shows a block diagram of a parallel multi-sector interference canceller 260e, which is another example of interference canceller 260. Interference canceller 260e performs interference cancellation for multiple (L) sectors and provides estimates of the signals transmitted by these L sectors.

Within interference canceller 260e, the received signal r (which corresponds to the received samples from receiver unit 254) is provided to L QLIC blocks 610a through 610l for the L sectors. Each QLIC block 610 derives a cancellation signal for its assigned sector and may be implemented as described below. A combiner 620 additively combines the cancellation signals $e_1$ through $e_L$ for all L sectors and provides a total cancellation signal $e_{total}$. For each sector j, a summer 612 subtracts the cancellation signal $e_j$ for that sector from the total cancellation signal $e_{total}$ and provides an other-sector cancellation signal $e_{os,j}$, which corresponds to the term $$\sum_{l \neq j} e_l$$

in equation (13). For each sector j, a summer 614 subtracts the other-sector cancellation signal $e_{os,j}$ for that sector from the received signal r to obtain a signal estimate $\hat{x}_j$ for that sector. The signal estimate $\hat{x}_j$ for each sector has the cancellation signals from the other L−1 sectors removed. Summers 614a through 614l provide the signal estimates $\hat{x}_1$ through $\hat{x}_L$ for the L sectors to L finger processors 650a through 650l, respectively, within rake receiver 270. Each finger processor 650 may perform demodulation as shown in equation (14) for its assigned sector.

FIG. 6 shows an embodiment of interference cancellation for multiple sectors in parallel. The cancellation signals for the L sectors are derived in parallel based on the received signal r. The accuracy of the cancellation signal for each sector is affected by the interference from all other sectors. The signal estimate $\hat{x}_j$ for each sector is then derived based on the cancellation signal $e_j$ for that sector, the total cancellation signal $e_{total}$ for all L sectors, and the received signal r.

Interference cancellation for multiple sectors may also be performed in a successive manner, i.e., a sequential or cascaded manner. Successive interference cancellation for L sectors may be performed in L successive stages, with the interference from one sector being canceled in each stage. The interference cancellation at each stage may be performed based on the output from a preceding stage, which may have the interference from all prior stages removed and may thus be "cleaner" than the received signal. Successive interference cancellation may improve performance. For example, if different sectors cause different amounts of interference, then interference cancellation may first be performed for a strong sector to suppress the signal component from this sector, and then performed for a weaker sector. The interference cancellation for the weaker sector may improve because the signal contribution from the strong sector has been attenuated. The cancellation of the strong sector reduces the $\sigma^2$ term in equation (6) for the weaker sector, which makes the gain matrix for the weaker sector more prominent and improves the characteristics of $\Lambda_j$ for the weaker sector. Hence, cancellation of the strong sector allows for better interference cancellation of the weaker sector.

Figure 7A:
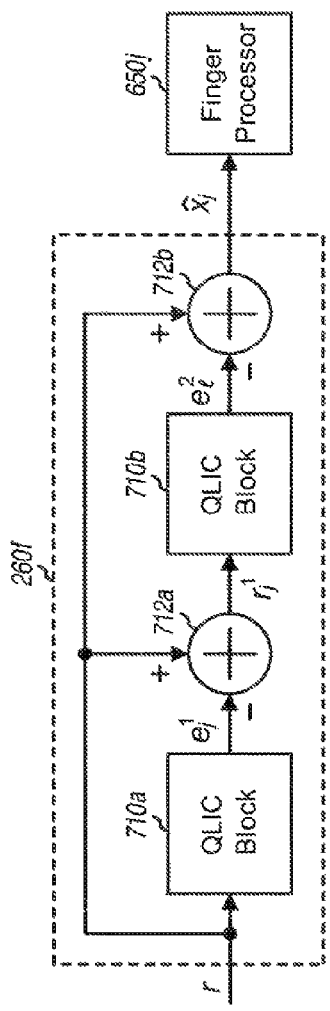
FIG. 7A shows a cascaded two-sector interference canceller.

FIG. 7A shows a block diagram of a cascaded two-sector interference canceller 260f, which is yet another embodiment of interference canceller 260. For this embodiment, the signal component for a desired sector j is first canceled, and the interference from an interfering sector l is then canceled to generate a signal estimate for the desired sector.

Within interference canceller 260f, the received signal r is provided to a QLIC block 710a, which derives a cancellation signal $e_j^1$ for the desired sector j. The superscript '1' in $e_j^1$ is for the stage number, and the subscript j is for the sector being processed by the stage. A summer 712a subtracts the cancellation signal $e_j^1$ from the received signal r and provides an intermediate signal $r_j^{\,1}$ having the signal component and distortion noise for the desired sector suppressed. A QLIC block 710b receives the intermediate signal $r_j^{\,1}$ and derives a cancellation signal $e_l^2$ for the interfering sector l. A summer 712b subtracts the cancellation signal $e_l^2$ from the received signal r and provides a signal estimate $\hat{x}_j$ containing the signal component for the desired sector but having the interference from the interfering sector suppressed. A finger processor 650j within rake receiver 270 performs demodulation on the signal estimate $\hat{x}_j$ for the desired sector j.

Figure 7B:
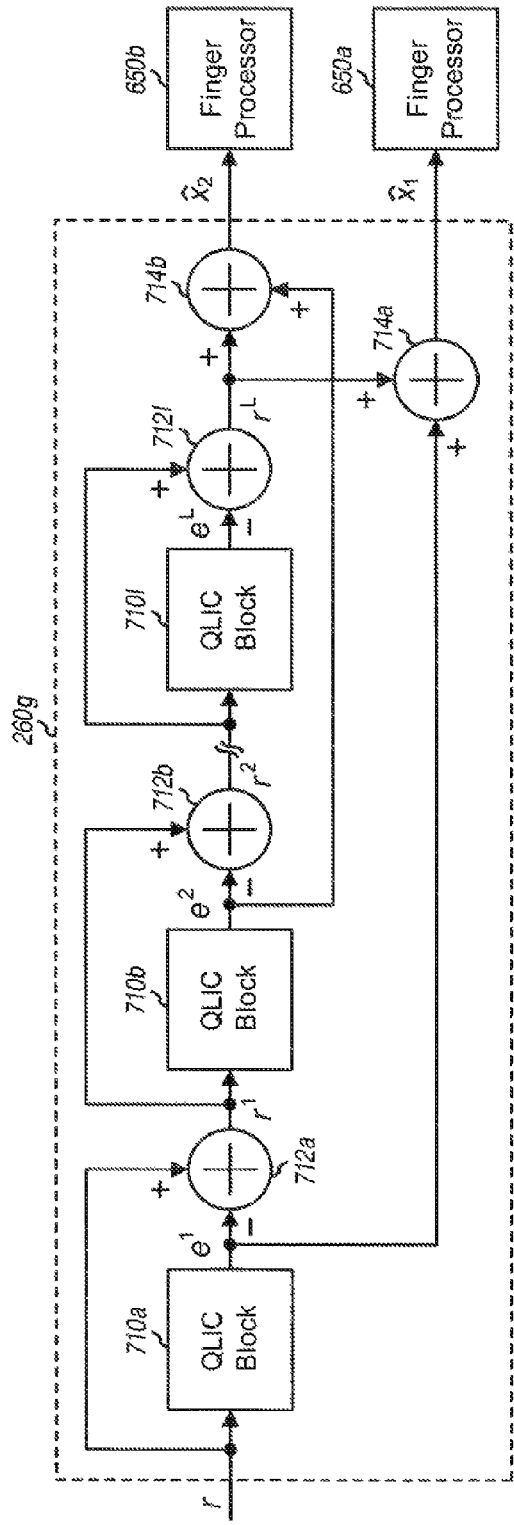
FIG. 7B shows a cascaded multi-sector interference canceller.

FIG. 7B shows a block diagram of a cascaded multi-sector interference canceller 260g, which is yet another embodiment of interference canceller 260. For this embodiment, the signal components for L sectors are successively suppressed in L stages.

Within interference canceller 260g, the received signal r is provided to QLIC block 710a, which derives a cancellation signal $e^1$ for the first sector. Summer 712a subtracts the cancellation signal $e^1$ from the received signal r and provides an intermediate signal $r^1$ having the signal component for the first sector suppressed. QLIC block 710b receives the intermediate signal $r^1$ and derives a cancellation signal $e^2$ for the second sector. A summer 712b subtracts the cancellation signal $e^2$ from the intermediate signal $r^1$ and provides an intermediate signal $r^2$ having the signal components for both the first and second sectors suppressed.

Each subsequent stage i operates in similar manner as stage 2. QLIC block 710 for stage i receives the intermediate signal $r^{i-1}$ from prior stage i−1 and derives a cancellation signal $e^i$ for sector i assigned to stage i. Summer 712 for stage i subtracts the cancellation signal $e^i$ from the intermediate signal $r^{i-1}$ generated by the prior stage and provides to the next stage an intermediate signal $r^i$ having the signal components for all sectors assigned to the current and prior stages suppressed.

Summer 712l for the last stage provides an intermediate signal $r^L$ having the signal components from all L sectors suppressed. A summer 714a adds the cancellation signal $e^1$ for the first sector with the intermediate signal $r^L$ and provides a signal estimate $\hat{x}_1$ for the first sector. A summer 714b adds the cancellation signal $e^2$ for the second sector with the intermediate signal $r^L$ and provides a signal estimate $\hat{x}_2$ for the second sector. Additional adders may be used to generate signal estimates for other sectors.

In an aspect, the sectors are assigned to the stages based on their signal strength. For example, the strongest received sector may be assigned to stage 1, the next strongest received sector may be assigned to stage 2, and so on. In another embodiment, the sector with the earliest arriving signal may be assigned to stage 1, the sector with the next arriving signal may be assigned to stage 2, and so on. The sectors may also be assigned to the stages in other manners.

Figure 8:
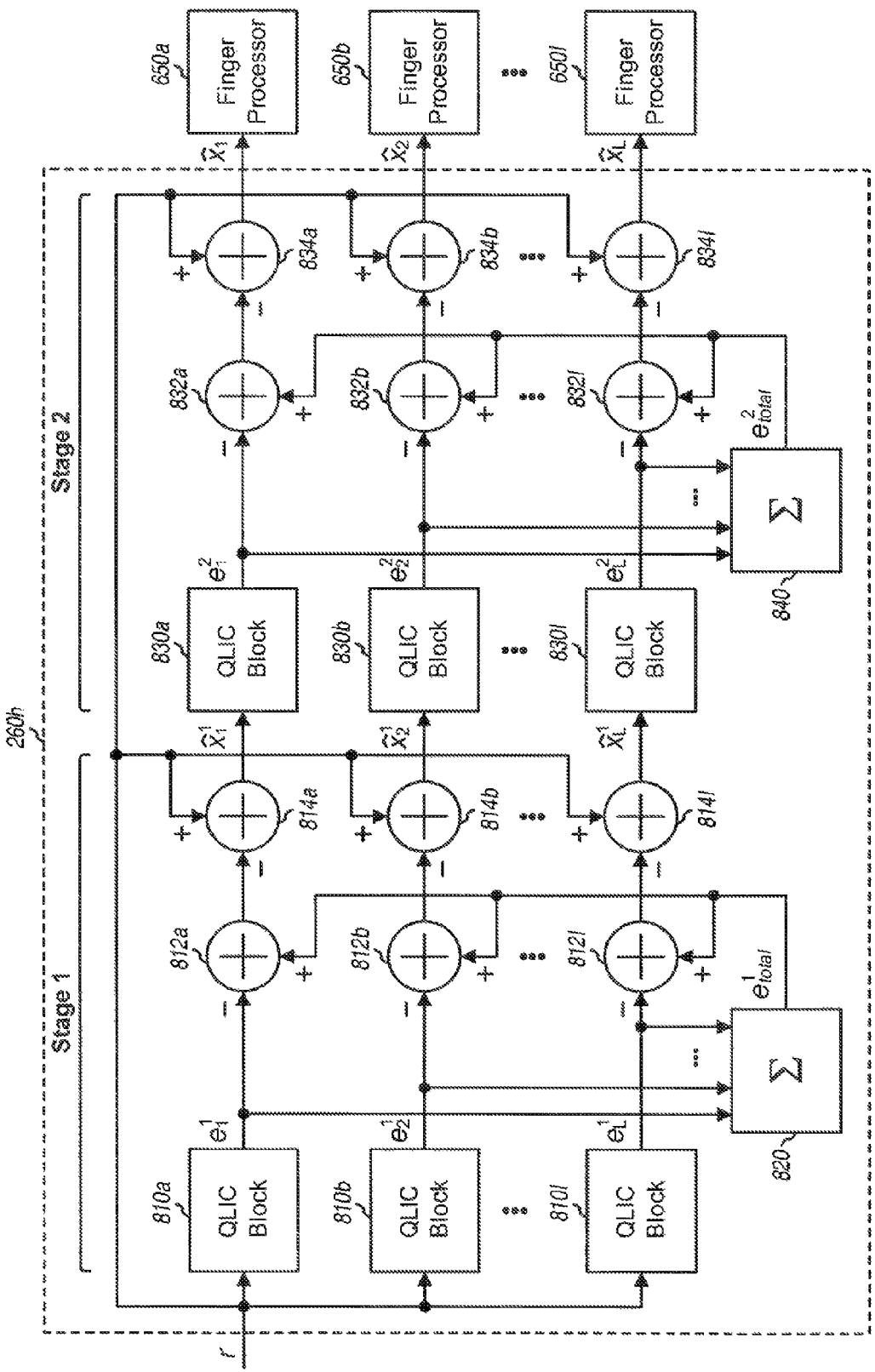
FIG. 8 shows a parallel two-stage interference canceller.

FIG. 8 shows a block diagram of a parallel two-stage interference canceller 260h, which is yet another embodiment of interference canceller 260. Interference canceller 260h is a combination of interference canceller 260e in FIG. 6 and interference canceller 260f in FIG. 7A.

For the first stage, the received signal r is provided to L QLIC blocks 810a through 810l for L sectors. Each QLIC block 810 derives a cancellation signal for its assigned sector based on the received signal. A combiner 820 additively combines the cancellation signals $e_1^1$ through $e_L^1$ from all L QLIC blocks 810a through 810l and provides a total cancellation signal $e_{total}^1$ for the first stage. For each sector j, a summer 812 subtracts the cancellation signal $e_j^1$ for that sector from the total cancellation signal $e_{total}^{\,1}$ and provides an other-sector cancellation signal $e_{os,j}^1$ is for that sector. For each sector j, a summer 814 subtracts the other-sector cancellation signal $e_{os,j}^1$ from the received signal r and provides an initial signal estimate $\hat{x}_j^1$ for that sector. The initial signal estimate for each sector has the cancellation signals from the other L−1 sectors removed. Summers 814a through 814l provide the initial signal estimates $\hat{x}_1^1$ through $\hat{x}_L^1$ for the L sectors.

For the second stage, QLIC blocks 830a through 830l receive the initial signal estimates $\hat{x}_1^1$ through $\hat{x}_L^1$ from summers 814a through 814l, respectively. Each QLIC block 830 derives a cancellation signal $e_j^2$ for its assigned sector j based on its initial signal estimate $\hat{x}_j^1$. For each sector j, the cancellation signal $e_j^2$ from the second stage is typically a better estimate of the signal component for sector j than the cancellation signal $e_j^1$ from the first stage because $e_j^2$ is derived based on the initial signal estimate $\hat{x}_j^1$ having the interference from the other L−1 sectors suppressed. A combiner 840 additively combines the cancellation signals $e_1^2$ through $e_L^2$ from all L QLIC blocks 830a through 830l and provides a total cancellation signal $e_{total}^2$ for the second stage. For each sector j, a summer 832 subtracts the cancellation signal $e_j^2$ for that sector from the total cancellation signal $e_{total}^2$ and provides an other-sector cancellation signal $e_{os,j}^2$ for the sector. For each sector j, a summer 834 subtracts the other-sector cancellation signal $e_{os,j}^2$ from the received signal r and provides a final signal estimate $\hat{x}_j$ for that sector. The final signal estimate $\hat{x}_j$ for each sector has the signal components from the other L−1 sectors suppressed. Summers 834a through 834l provide the final signal estimates $\hat{x}_1$ through $\hat{x}_L$ for the L sectors to L finger processors 650a through 650l, respectively, within rake receiver 270.

FIGS. 6 through 8 show some exemplary interference cancellers that perform interference cancellation for one or multiple sectors. Each QLIC block in FIGS. 6 through 8 may derive a cancellation signal for one signal path of one sector (per path processing), multiple signal paths of one sector (per sector processing), or multiple signal paths of multiple sectors (multi-sector processing). The multiple signal paths processed by a given QLIC block may be for one or multiple receive antennas. Other interference cancellers may also be designed based on the description provided herein. For example, the embodiment shown in FIG. 8 may be extended to include more than two cascaded interference cancellation stages.

FIG. 9A through FIG. 9H show block diagrams of examples of a QLIC block, which may be used for each QLIC block in interference cancellers 260e through 260h shown in FIGS. 6 through 8. An estimator 901 processes the received samples and the interference-cancelled samples to generate cancellation signals corresponding to an estimate of the transmitted signals. Accordingly, an estimate of the signal transmitted by a particular transmitter is derived based on the interference cancelled samples. The estimates can be used to reduce or eliminate signals transmitted from all but a desired transmitter.

Figure 9A:
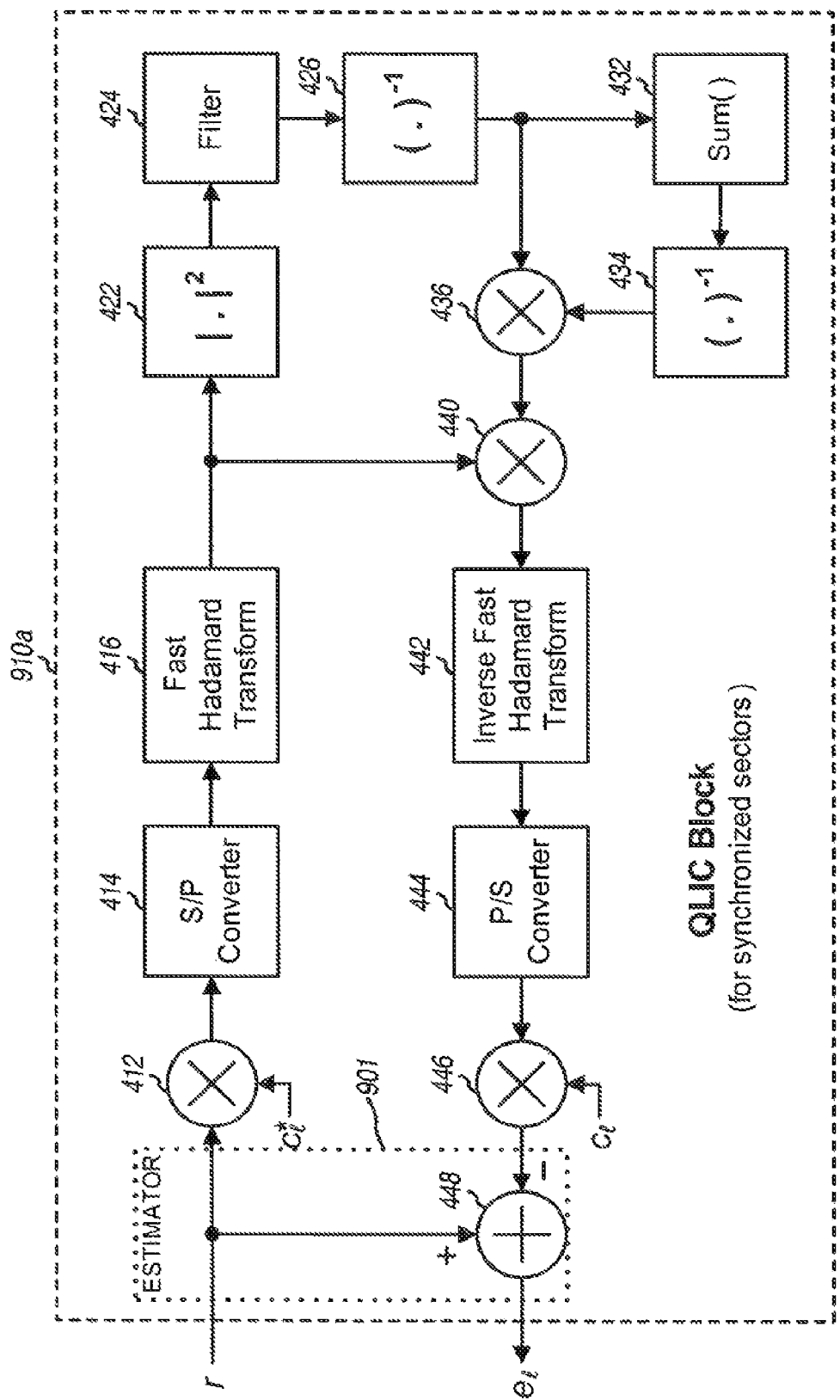
FIGS. 9A through 9D show four embodiments of a quasi-linear interference cancellation (QLIC) block.

FIG. 9A shows a block diagram of a QLIC block 910a, which may be used for each QLIC block in interference cancellers 260e through 260h shown in FIGS. 6 through 8. QLIC block 910a receives incoming samples and generates samples for a cancellation signal $e_l$ for one sector 1. For clarity, FIG. 9A shows QLIC block 910a being used for the first stage, so that the incoming samples are the received samples for the received signal r. QLIC block 910a does not perform resampling of the incoming samples and may be used in multi-sector interference cancellers 260e through 260h if the sectors are synchronized and the signals from these sectors are received at the wireless device aligned in time.

Within QLIC block 910a, multiplier 412, serial-to-parallel converter 414, FHT unit 416, squared magnitude unit 422, filter 424, and inverse unit 426 operate as described above for FIG. 4. Inverse unit 426 provides N inverse power estimates, which are estimates of the diagonal elements of $\Lambda_l^{-1}$. A summer 432 sums the N inverse power estimates and computes the trace of $\Lambda_l^{-1}$. A unit 434 computes the inverse of the trace of $\Lambda_l^{-1}$ and provides the scaling factor $1/\text{tr}(\Lambda_l^{-1})$. A multiplier 436 multiplies each of the N inverse power estimates from unit 426 with the scaling factor $1/\text{tr}(\Lambda_l^{-1})$. Multiplier 436 may also be located after multiplier 446, as indicated by equation (12). IFHT unit 442, parallel-to-serial converter 444, and multiplier 446 operate as described above for FIG. 4A-4H. Multiplier 446 provides interference-canceled samples having the signal component and distortion noise for sector 1 attenuated based on the inverse covariance matrix $\Lambda_l^{-1}$. A summer 448 subtracts the interference-canceled samples from the received samples and provides the cancellation samples $e_l$ for sector 1. Accordingly, the summer 448 performs the functions of the estimator 901 in the example of FIG. 9A.

For the embodiment shown in FIG. 9A, the received samples r are temporarily stored until the corresponding samples from multiplier 446 are available. In another embodiment, summer 448 is located between multiplier 440 and IFHT unit 442, and appropriate scaling is performed to accommodate this move of summer 448. For this example, summer 448 subtracts the output of multiplier 440 from the output of FHT unit 416 and provides its output to IFHT unit 442. This embodiment ameliorates the need to store the received samples and reduces buffering requirement.

Figure 9B:
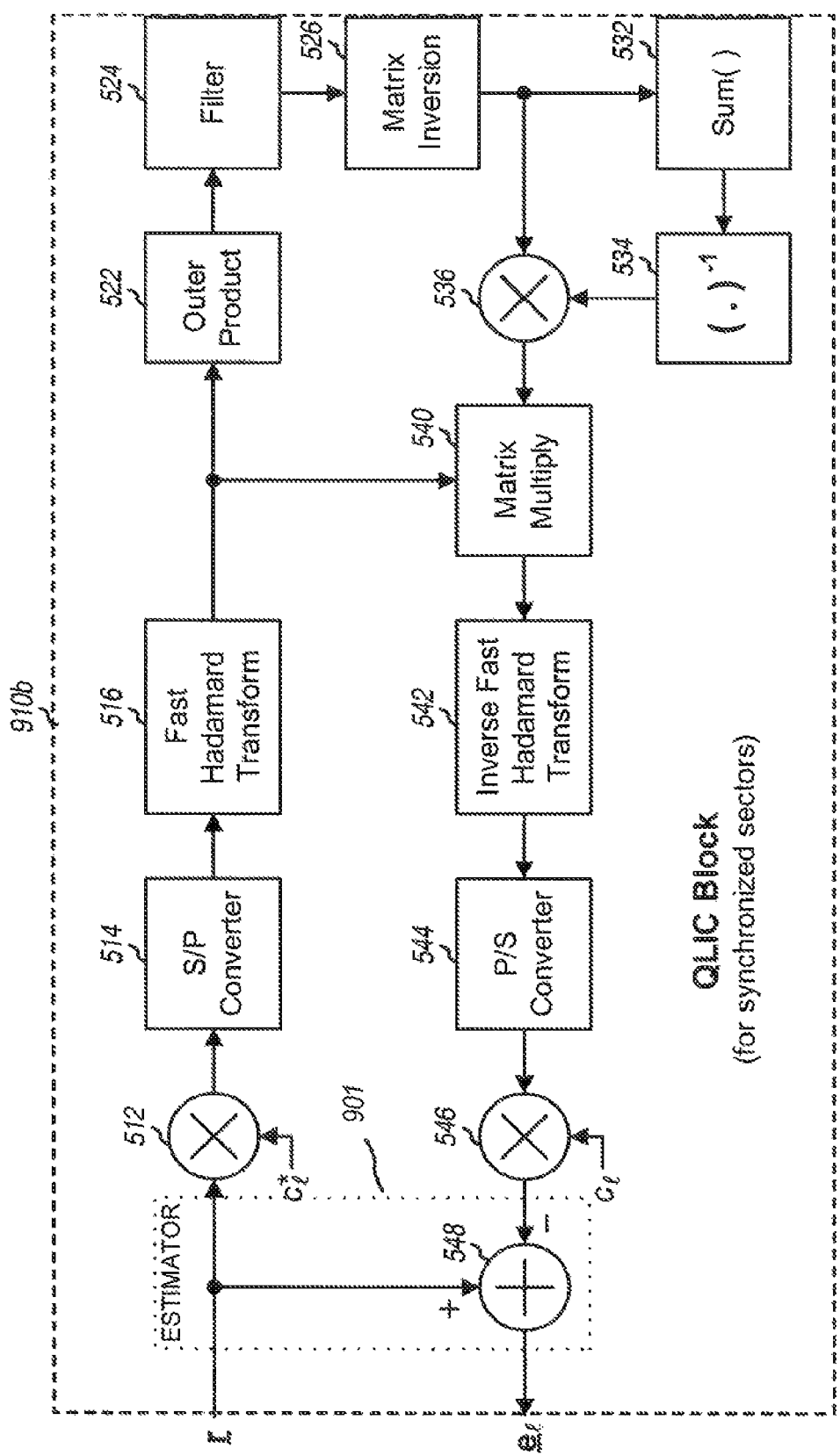

FIG. 9B shows a block diagram of a QLIC block 910b, which may also be used for each QLIC block in interference cancellers 260e through 260h. QLIC block 910b generates samples for a cancellation signal $e_l$ for one sector 1 based on the received samples. QLIC block 910b includes units 512 through 526 and units 540 through 546 that operate as described above for FIG. 5. Unit 526 provides an estimate of $\Lambda_l^{-1}$ for each Walsh bin. QLIC block 910b further includes units 532, 534 and 536 that compute the proper weight for sector 1. For each symbol period, unit 532 sums the estimates of $\Lambda_l^{-1}$ for all N Walsh bins and provides an intermediate matrix. Unit 534 computes an inverse of the intermediate matrix and provides an intermediate matrix for sector 1. Multiplier 536 multiplies the estimate of $\Lambda_l^{-1}$ for each Walsh bin with the intermediate matrix and provides a gain matrix for that Walsh bin. The multiplication by multiplier 536 may also be moved, e.g., either before or after multiplier 546. Multiplier 540 multiplies the vector of received symbols for each Walsh bin with the gain matrix for that Walsh bin and provides a corresponding vector of resultant symbols.

Figure 9C:
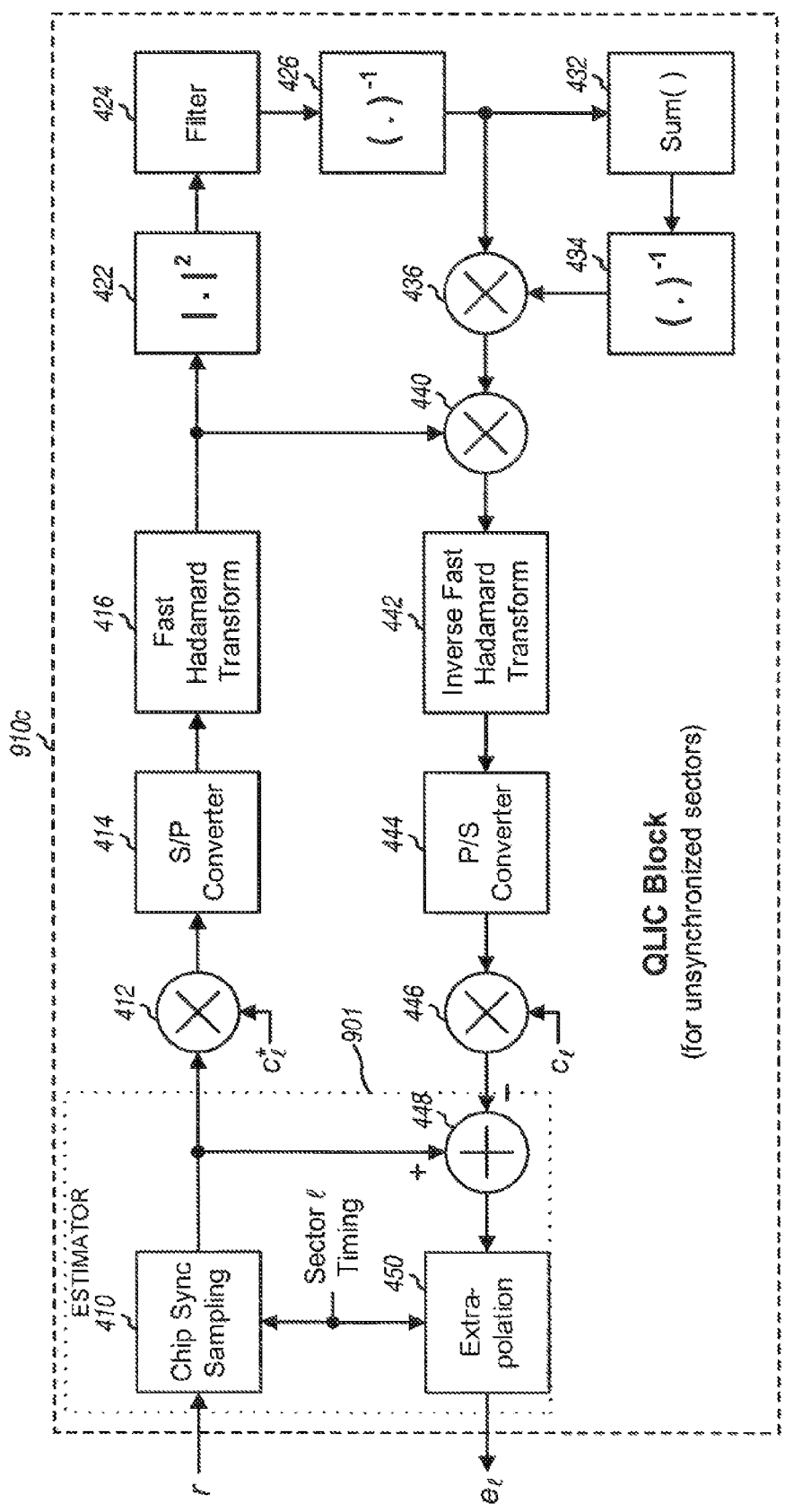

FIG. 9C shows a block diagram of a QLIC block 910c, which may also be used for each QLIC block in interference cancellers 260e through 260h. QLIC block 910c generates samples for a cancellation signal $e_l$ for one sector 1 based on the received samples. QLIC block 910c performs resampling of the received samples to the proper chip timing and may be used in multi-sector interference cancellers 260e through 260h even if the sectors are unsynchronized and the signals from these sectors are received at the wireless device not aligned in time.

Within QLIC block 910c, a unit 410 performs resampling (e.g., interpolation) on the received samples based on the timing of sector 1 to synchronize with chip timing. For example, unit 410 may obtain the received samples at twice the chip rate (or chip×2) and may generate interpolated samples at chip rate (or chip×1) and with the timing of sector 1. The timing of sector 1 may be ascertained based on a pilot received from sector 1 and may be tracked with a time tracking loop, as is known in the art. Units 412 through 448 process the interpolated samples as described above for FIGS. 4A-4H and 9A. Summer 448 provides samples that are aligned with the timing of sector 1. An extrapolation unit 450 performs extrapolation on the samples from summer 448 and provides cancellation samples at the same rate and with the same timing as the received samples. Accordingly, the chip sync sampling unit 410 and the extrapolation unit 450 perform the functions of the estimator 901 in the example of FIG. 9C.

In FIGS. 6 through 8, each QLIC block may operate based on the timing of the sector assigned to that QLIC block. The extrapolation by unit 450 aligns the timing of the cancellation samples for all sectors so that these samples can be additively combined by combiners 620, 820 and 840.

Figure 9D:
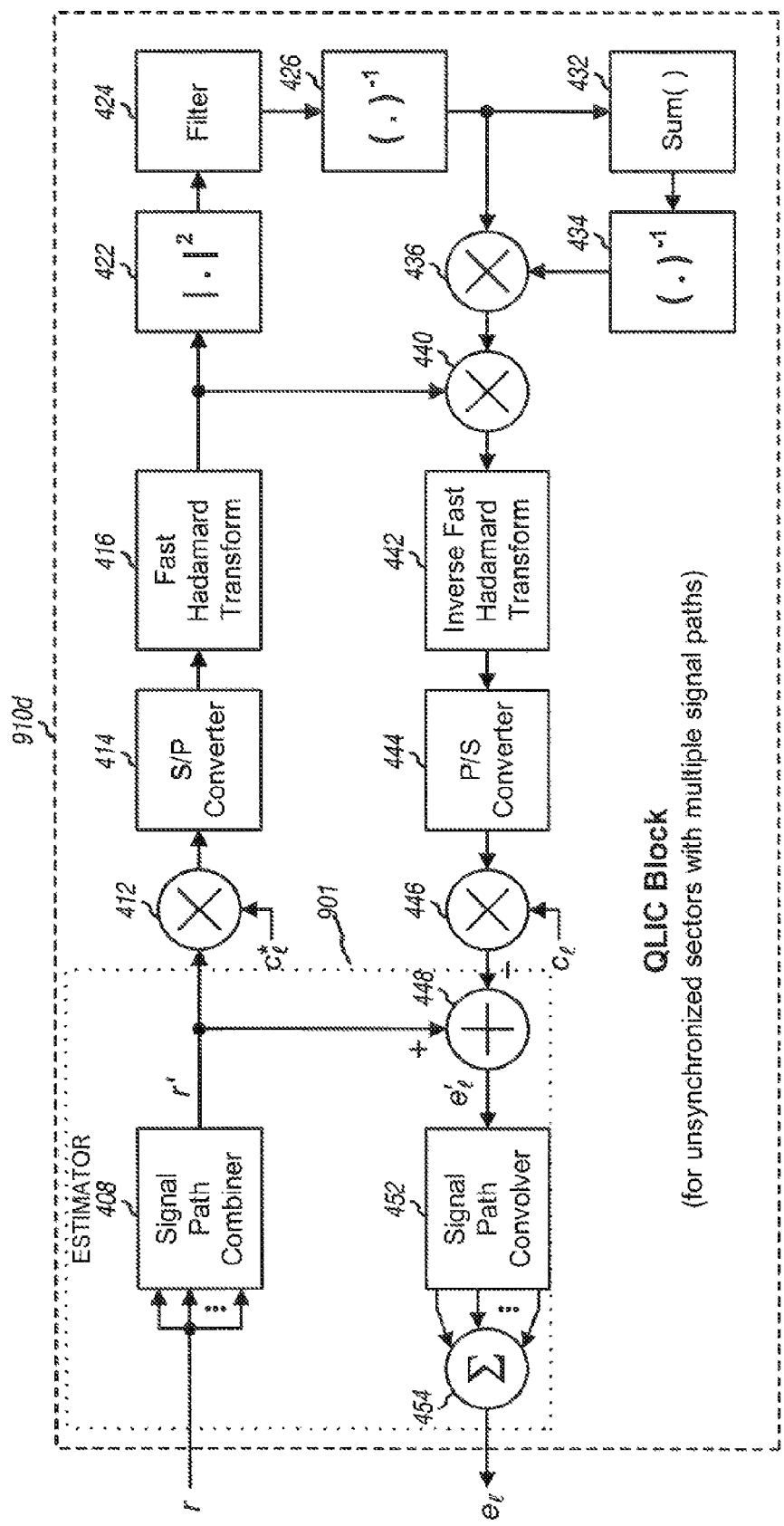

FIG. 9D shows a block diagram of a QLIC block 910d, which may also be used for each QLIC block in interference cancellers 260e through 260h. QLIC block 910d generates samples for a cancellation signal $e_l$ for one sector l based on the received samples. QLIC block 910d can process multiple signal paths for sector l. These multiple signal paths may be multipaths for one receive antenna or multiple signal paths for multiple receive antennas.

QLIC block 910d includes units 412 through 448 that operate as described above for FIGS. 4A-4H and 9A. QLIC block 910d further includes a signal path combiner 408 and a signal path convolver 452. Signal path combiner 408 performs additive weighted combining of the signal paths for sector l, e.g., to maximize the SINR of this sector. Signal path combiner 408 may be implemented with an equalizer, a pilot-weighted combiner, and so on. Signal path convolver 452 performs impulse response shaping to match the effective impulse response of sector l. The output from summer 448 is an estimate of the signal component for sector l. Signal path convolver 452 models the wireless channel between sector l and the wireless device. The outputs of signal path convolver 452 are cancellation signals for the individual signal paths of sector l. A combiner 454 combines the cancellation signals for all signal paths of sector l and provides the cancellation signal for sector l, which is an estimate of the interference observed at the wireless device from sector l. The signal path combiner summer 448 and the signal path convolver 454 and the combiner 454 for the estimator 901 in the example of FIG. 9D.

Figure 9E:
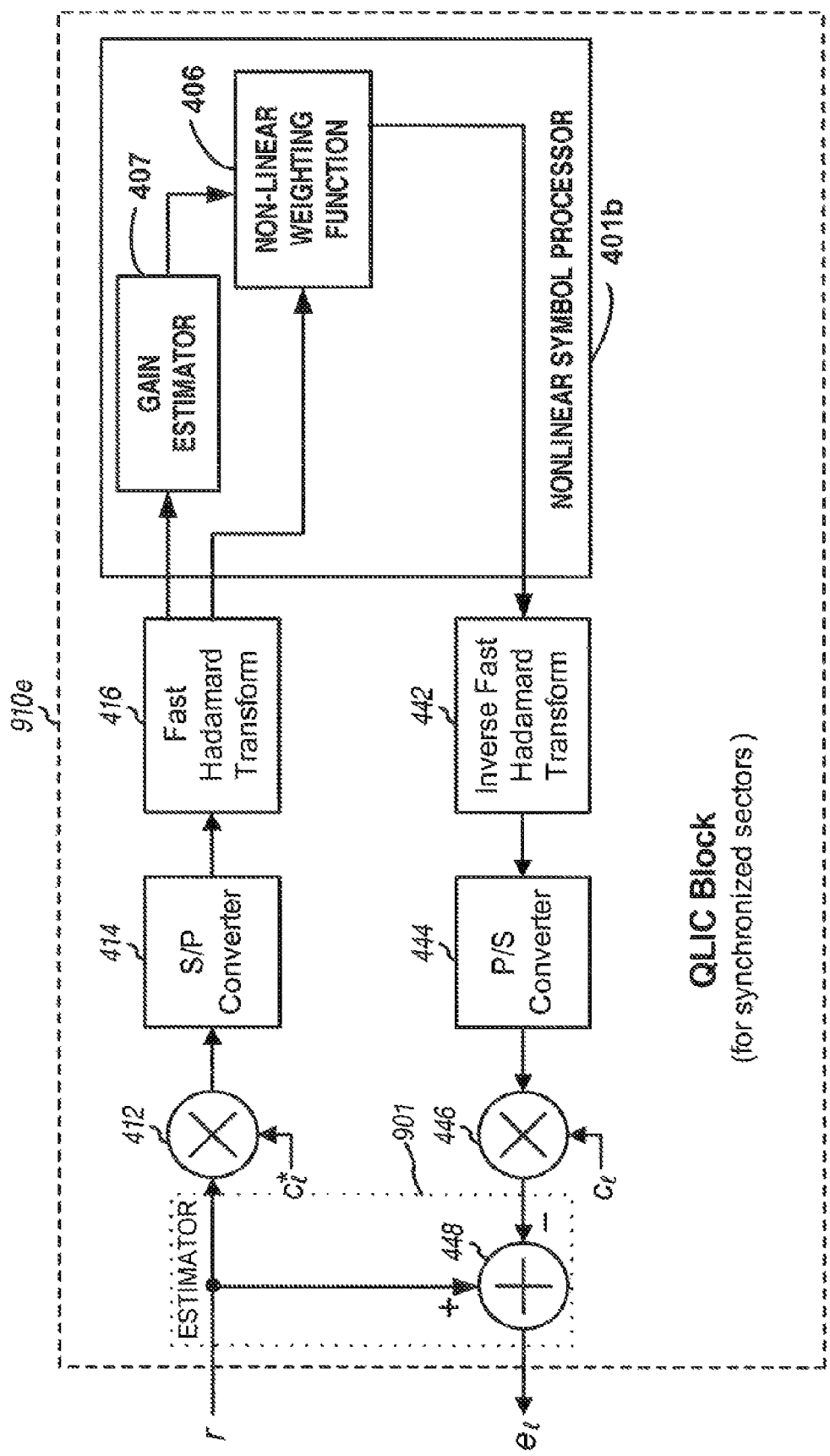
FIGS. 9E through 9H show four embodiments of a quasi-linear interference cancellation (QLIC) block with a nonlinear symbol processor.

FIG. 9E-FIG. 9H are block diagrams of QLIC blocks that may be used for the QLIC blocks in the interferences cancellers 260e-260h shown in FIG. 6-FIG. 8. For the examples of FIG. 9E-FIG. 9H, the symbol processor 401 is a nonlinear processor. Examples of nonlinear symbol processors are discussed above with reference to FIG. 4G and 4H. FIG. 9E is a block diagram of a QLIC block 910e, which may be used for each QLIC block in interference cancellers 260e through 260h shown in FIGS. 6 through 8. In the example of FIG. 9E, the QLIC includes a nonlinear symbol processor 401b where the QLIC block 910e receives incoming samples and generates samples for a cancellation signal $e_l$ for one sector l. For clarity, FIG. 9A shows QLIC block 910a being used for the first stage, so that the incoming samples are the received samples for the received signal r. QLIC block 910e does not perform resampling of the incoming samples and may be used in multi-sector interference cancellers 260e through 260h if the sectors are synchronized and the signals from these sectors are received at the wireless device aligned in time.

Within QLIC block 910e, multiplier 412, serial-to-parallel converter 414, FHT unit 416, squared magnitude unit 422, filter 424, and inverse unit 426 operate as described above for FIGS. 4A-4H. The nonlinear weighting function applies the gain estimates provided by the gain estimator 407. The IFHT unit 442, parallel-to-serial converter 444, and multiplier 446 operate as described above for FIG. 4A-4H. Multiplier 446 provides interference-canceled samples having the signal component and distortion noise for sector l attenuated based on the nonlinear function of the symbol processor. A summer 448 subtracts the interference-canceled samples from the received samples and provides the cancellation samples $e_l$ for sector l.

For the embodiment shown in FIG. 9E, the received samples r are temporarily stored until the corresponding samples from multiplier 446 are available. In some situations the, summer 448 is located between multiplier 440 and IFHT unit 442, and appropriate scaling is performed to accommodate this move of summer 448. For this example, summer 448 subtracts the output of symbol processor 401b from the output of FHT unit 416 and provides its output to IFHT unit 442. Accordingly, the summer 448 performs the functions of the estimator 901 in the example of FIG. 9A.

Figure 9F:
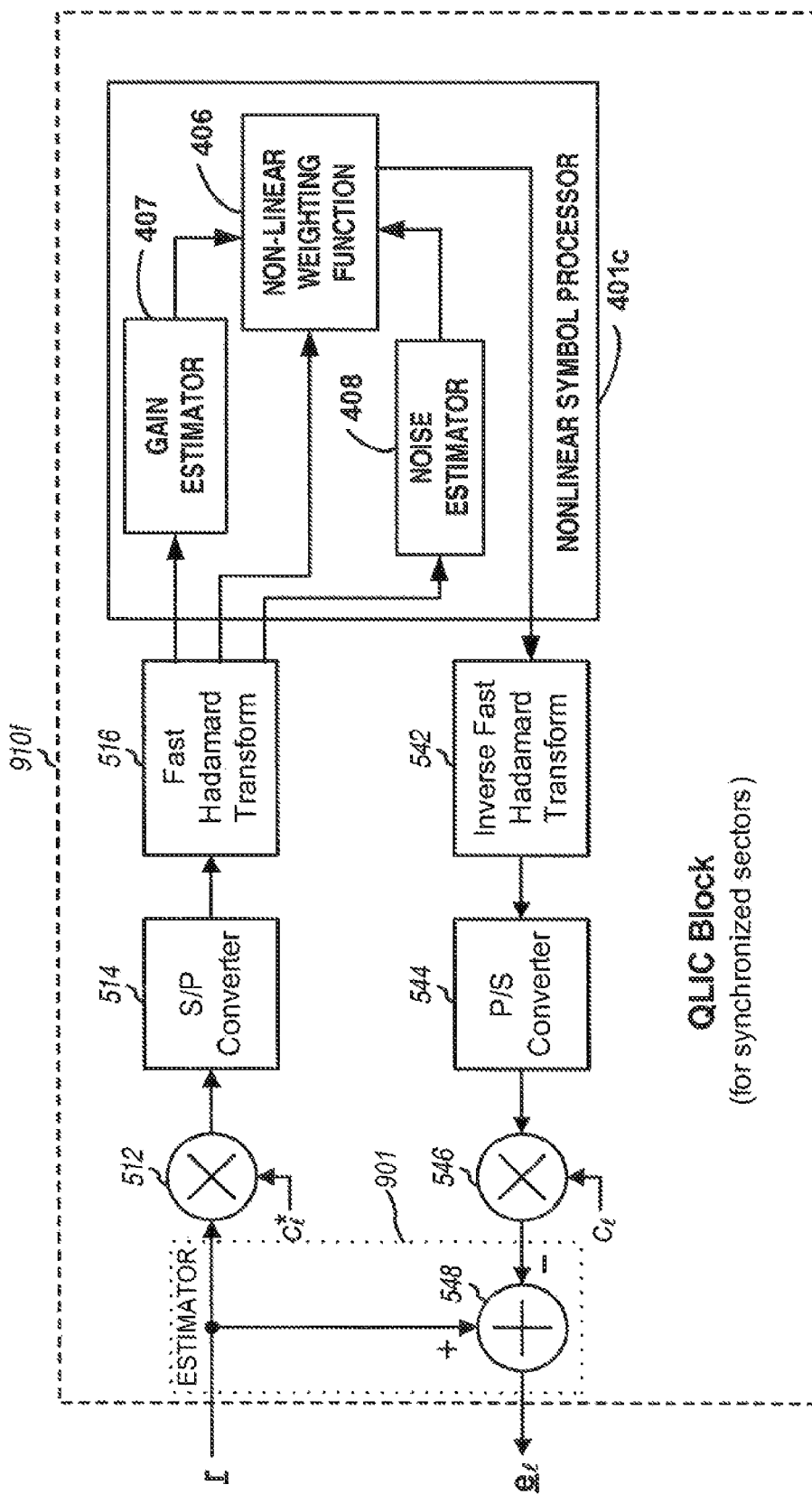

FIG. 9F shows a block diagram of a QLIC block 910f, which may also be used for each QLIC block in interference cancellers 260e through 260h. In the example of FIG. 9F, the QLIC includes a nonlinear symbol processor 401c and generates samples for a cancellation signal $e_l$ for one sector l based on the received samples.

Figure 9G:
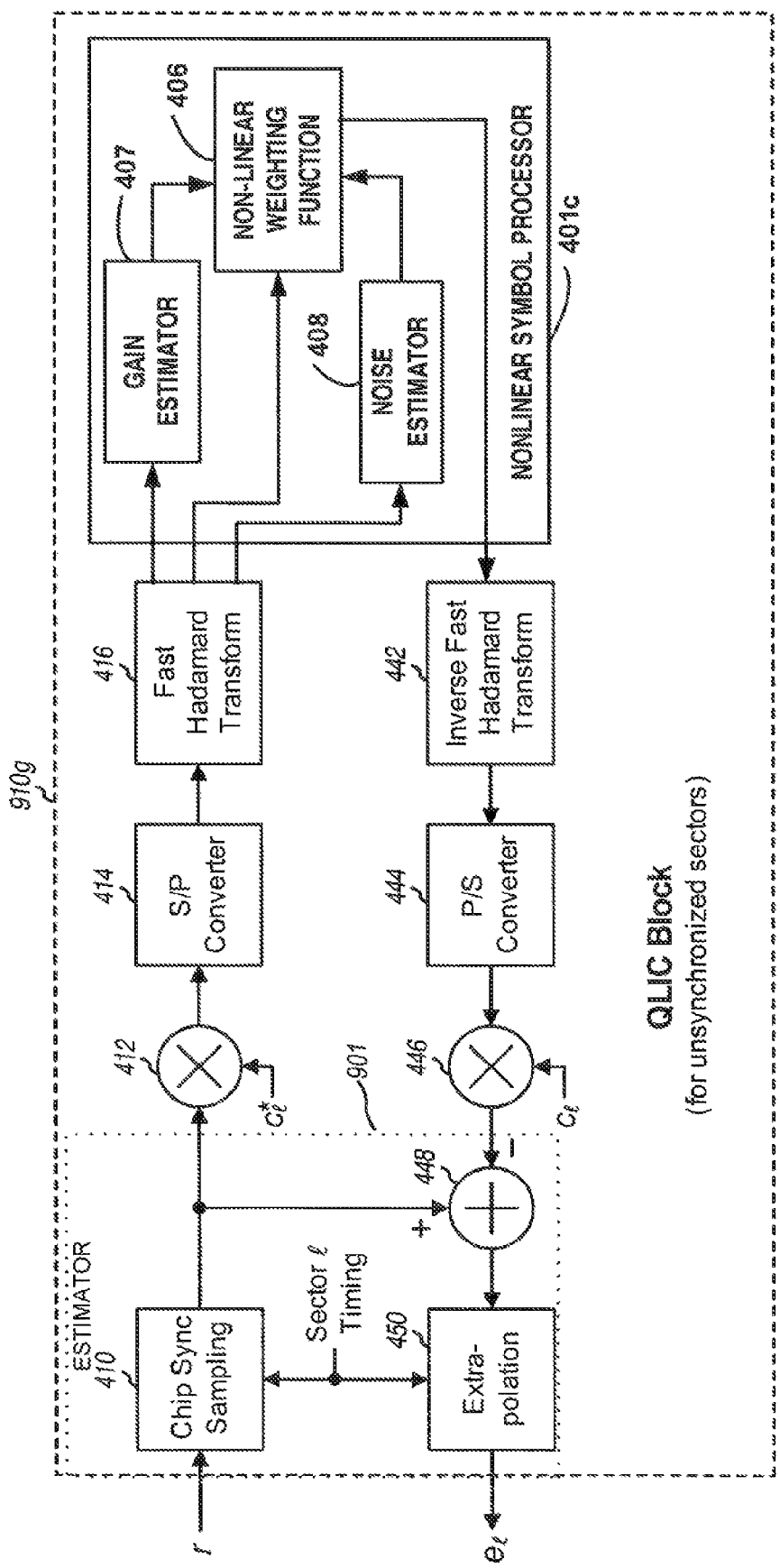

FIG. 9G shows a block diagram of a QLIC block 910g, which may also be used for each QLIC block in interference cancellers 260e through 260h. In the example of FIG. 9F, the QLIC includes a nonlinear symbol processor 401c and generates samples for a cancellation signal $e_l$ for one sector l based on the received samples. QLIC block 910c performs resampling of the received samples to the proper chip timing and may be used in multi-sector interference cancellers 260e through 260h even if the sectors are unsynchronized and the signals from these sectors are received at the wireless device not aligned in time.

Within QLIC block 910g, a unit 410 performs resampling (e.g., interpolation) on the received samples based on the timing of sector l to synchronize with chip timing. For example, unit 410 may obtain the received samples at twice the chip rate (or chip×2) and may generate interpolated samples at chip rate (or chip×1) and with the timing of sector l. The timing of sector l may be ascertained based on a pilot received from sector l and may be tracked with a time tracking loop, as is known in the art. Units 412 through 448 process the interpolated samples as described above for FIGS. 4A-4H and 9A. Summer 448 provides samples that are aligned with the timing of sector . An extrapolation unit 450 performs extrapolation on the samples from summer 448 and provides cancellation samples at the same rate and with the same timing as the received samples. The signal path combiner summer 448 and the signal path convolver 454 and the combiner 454 for the estimator 901 in the example of FIG. 9G.

In FIGS. 6 through 8, each QLIC block may operate based on the timing of the sector assigned to that QLIC block. The extrapolation by unit 450 aligns the timing of the cancellation samples for all sectors so that these samples can be additively combined by combiners 620, 820 and 840.

Figure 9H:
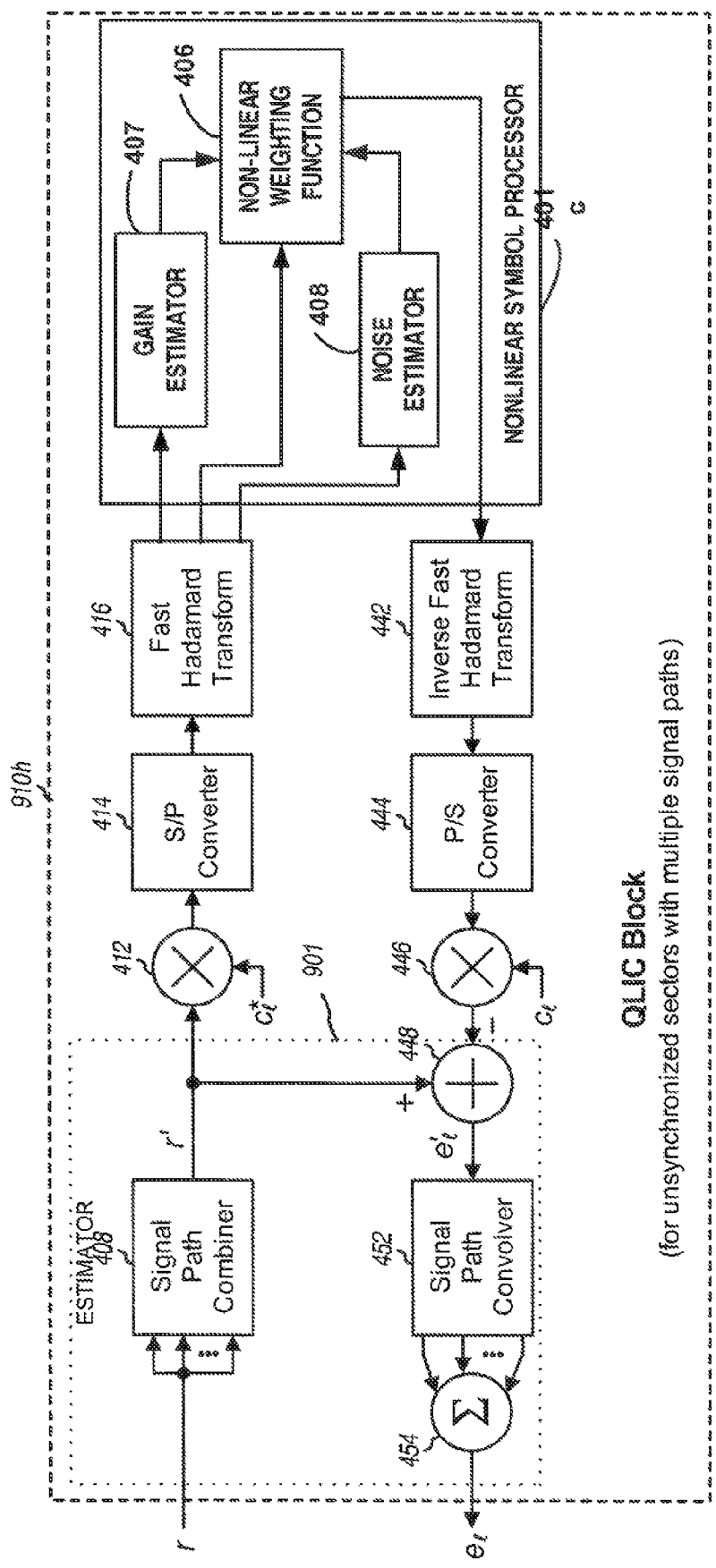

FIG. 9H shows a block diagram of a QLIC block 910h, which may also be used for each QLIC block in interference cancellers 260e through 260h. In the example of FIG. 9H, the QLIC includes a nonlinear symbol processor 401c and generates samples for a cancellation signal $e_l$ for one sector l based on the received samples. QLIC block 910h can process multiple signal paths for sector l. These multiple signal paths may be multipaths for one receive antenna or multiple signal paths for multiple receive antennas.

QLIC block 910h includes units 412 through 448 that operate as described above for FIGS. 4A-4H and 9A. QLIC block 910h further includes a signal path combiner 408 and a signal path convolver 452. Signal path combiner 408 performs additive weighted combining of the signal paths for sector l, e.g., to maximize the SINR of this sector. Signal path combiner 408 may be implemented with an equalizer, a pilot-weighted combiner, and so on. Signal path convolver 452 performs impulse response shaping to match the effective impulse response of sector l. The output from summer 448 is an estimate of the signal component for sector l. Signal path convolver 452 models the wireless channel between sector l and the wireless device. The outputs of signal path convolver 452 are cancellation signals for the individual signal paths of sector l. A combiner 454 combines the cancellation signals for all signal paths of sector l and provides the cancellation signal for sector l, which is an estimate of the interference observed at the wireless device from sector l. The signal path combiner summer 448 and the signal path convolver 454 and the combiner 454 for the estimator 901 in the example of FIG. 9H.

Therefore, where one of the exemplary QLIC blocks is applied to the exemplary implementation of FIG. 7A, a first interference cancellation block (QLIC block 710*a*) is formed by the despreader, decover unit, symbol processor, covering unit, spreader and estimator and another interference cancellation block (QLIC block 710*b*) generate another cancellation signal corresponding to an estimate of transmitted signals transmitted from another transmitter. The finger processor 650*j* demodulates the desired signal reduced by the cancellation signal generated by the interference cancellation block. Continuing with the example in FIG. 7A, the first summer 712*a* subtracts the cancellation signal from the received samples to generate an intermediate signal which is used by the second interference cancellation block to generate another cancellation signal. The second summer 712*b* subtracts the other cancellation signal from the received samples to generate the desired signal.

Figure 10B:
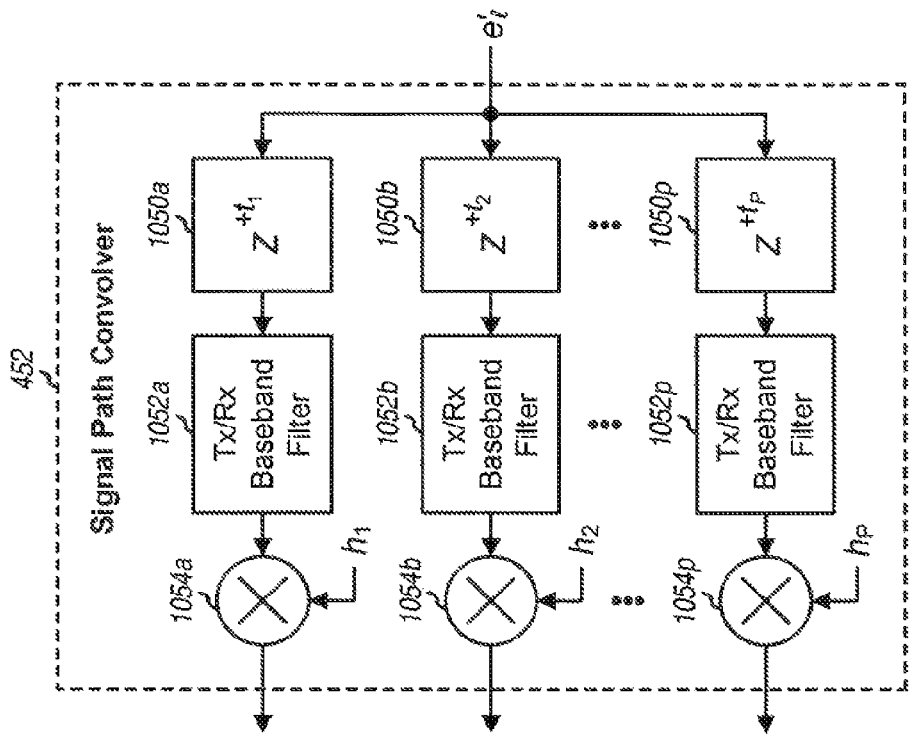
FIG. 10B shows a signal path convolver.
Figure 10A:
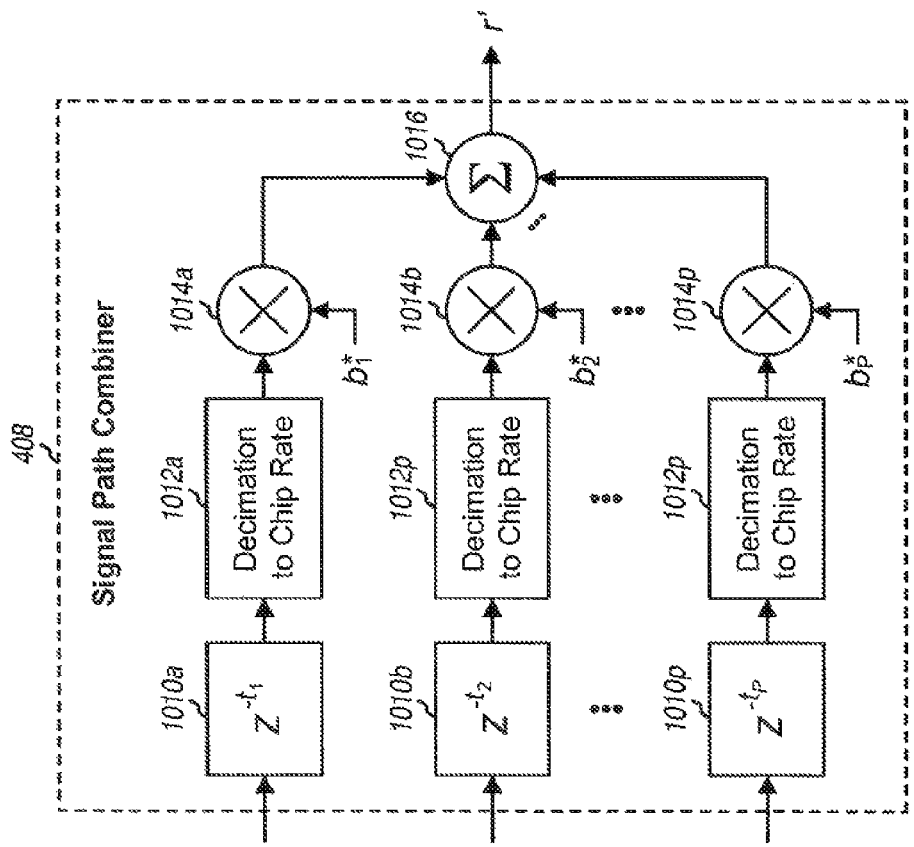
FIG. 10A shows a signal path combiner.

FIG. 10A shows a block diagram of an embodiment of signal path combiner 408 in FIG. 9D. The received samples r are provided to P delay elements 1010*a* through 1010*p* for P signal paths for sector l, where P≧1. The signal paths may be identified by a searcher within rake receiver 270 based on a pilot received from sector l, as is known in the art. The timing and received signal quality for each signal path may also be ascertained based on the received pilot. Each delay element 1010 delays the received samples by the delay $t_p$ for its assigned signal path. The delayed samples from all P delay elements 1010*a* through 1010*p* are aligned in time. Units 1012*a* through 1012*p* receive the delayed samples from delay elements 1010*a* through 1010*p*, respectively, and decimate these delayed samples to obtain decimated samples at chip rate. Multipliers 1014*a* through 1014*p* receive the decimated samples from units 1012*a* through 1012*p*, respectively, and the conjugated weights $b_1^*$ through $b_P^*$, respectively, for the P signal paths. The weight for each signal path may be derived based on the channel gain, received signal strength, received signal quality, or some other metric for that signal path. Each multiplier 1014 scales the decimated samples for its assigned signal path with the weight for that signal path and provides scaled samples. A combiner 1016 combines the scaled samples for all P signal paths and provides composite samples r' for sector l.

FIG. 10B shows a block diagram of an embodiment of signal path convolver 452. The samples from summer 448 in FIG. 9D are provided to P delay elements 1050*a* through 1050*p* for the P signal paths of sector . Each delay element 1050 advances its samples by the delay of its assigned signal path. The delayed samples from all P delay elements 1050*a* through 1050*p* are aligned with the timing of the P signal paths. Filters 1052*a* through 1052*p* receive the delayed samples from delay elements 1050*a* through 1050*p*, respectively, and filter the delayed samples with the combined baseband filter response for the transmit and receive sides. Multipliers 1054*a* through 1054*p* receive the filtered samples from filters 1052*a* through 1052*p*, respectively, and the channel gains $h_1$ through $h_P$, respectively, for the P signal paths. The channel gain for each signal path may be estimated based on the received pilot. Each multiplier 1054 scales the filtered samples for its assigned signal path with the channel gain for that signal path and provides cancellation samples for that signal path. Multipliers 1054*a* through 1054*p* provide P cancellation signals for the P signal paths of sector l.

For interference cancellers 260*c*, 260*d*, 260*e* and 260*f* in FIGS. 6, 7A, 7B and 8, respectively, each processing path from the received signal r to a finger processor 650 may be for a sector or a signal path of a sector. The processing paths may also be formed in other manners.

Figure 11:
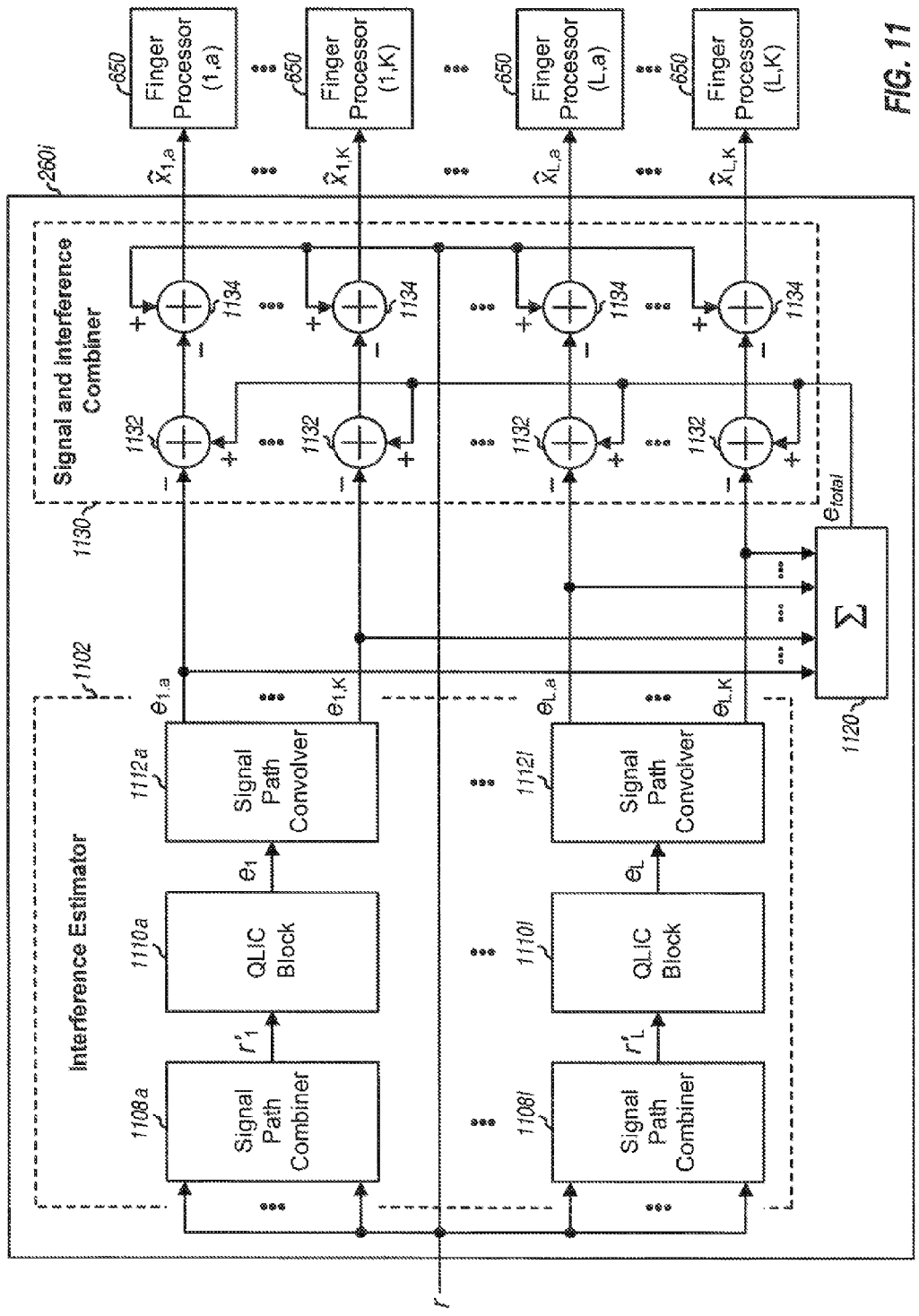
FIG. 11 shows an interference canceller with processing per signal path.

FIG. 11 shows a block diagram of an interference canceller 260*i*, which is yet another embodiment of interference canceller 260 in FIG. 2. Interference canceller 260*i* derives a cancellation signal for each sector but performs interference cancellation for the individual signal paths of each sector.

Canceller 260*i* includes an interference estimator 1102, a combiner 1120, and a signal and interference combiner 1130. Within interference estimator 1102, the received signal r is provided to L signal path combiners 1108*a* through 1108*l* for L sectors. Each signal path combiner 1108 performs additive weighted combining of the signal paths for its assigned sector and provides a composite signal for that sector. Each signal path combiner 1108 may be implemented with signal path combiner 408 in FIG. 10A or with some other design. Signal path combiners 1108*a* through 1108*l* may process the same number of (K) signal paths (as shown in FIG. 11) or different numbers of signal paths. Signal path combiners 1108*a* through 1108*l* provide L composite signals $r_1'$ through $r_L'$ for the L sectors to L QLIC blocks 1110*a* through 1110*l*, respectively. Each QLIC block 1110 derives a cancellation signal for its assigned sector based on its composite signal. Each QLIC block 1110 may be implemented with QLIC block 910*a*, 910*b* or 910*c* or with some other QLIC design. QLIC blocks 110*a* through 1110*l* provide L cancellation signals $e_1$ through $e_L$ for the L sectors to L signal path convolvers 1112*a* through 1112*l*, respectively. Each signal path convolver 1112 performs impulse response shaping on the cancellation signal for its assigned sector and provides cancellation signals for the signal paths of that sector. Each signal path convolver 1112 may be implemented with signal path convolver 452 in FIG. 10B or with some other design. A combiner 1120 additively combines the cancellation signals for all signal paths of all L sectors from all L signal path convolvers 1112*a* through 1112*l* and provides a total cancellation signal $e_{total}$.

Signal and interference combiner 1130 includes a pair of summers 1132 and 1134 for each signal path of each sector. For each signal path k of each sector j, a summer 1132 subtracts the cancellation signal $e_{j,k}$ for that sector from the total cancellation signal $e_{total}$ and provides an other-sector cancellation signal $e_{os,j}$. For each signal path k of each sector j, a summer 1134 subtracts the other-sector cancellation signal $e_{os,j,k}$ from the received signal r and provides a signal estimate $\hat{x}_{j,k}$ for signal path k of sector j. Each signal estimate is processed by a respective finger processor 650 within rake receiver 270.

Figure 12:
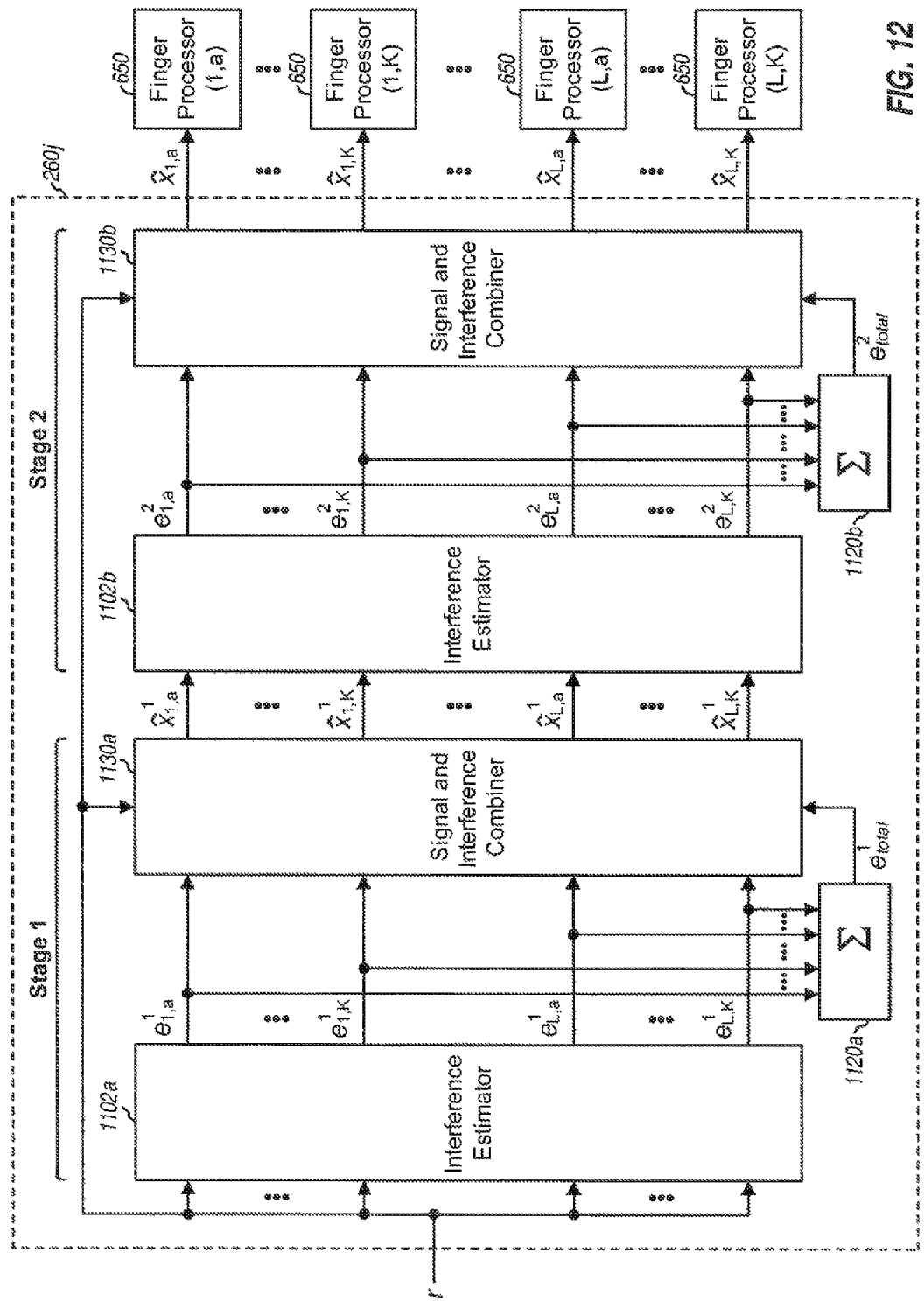
FIG. 12 shows a two-stage interference canceller with processing per signal path.

FIG. 12 shows a block diagram of a two-stage interference canceller 260*j*, which is yet another embodiment of interference canceller 260 in FIG. 2. Interference canceller 260*j* includes two stages. Each stage derives a cancellation signal for each sector but performs interference cancellation for individual signal paths of each sector.

For the first stage, the received signal r is provided to an interference estimator 1102*a*, which may be implemented with interference estimator 1102 in FIG. 11. Interference estimator 1102*a* derives cancellation signals for the signal paths of the L sectors. A combiner 1120*a* additively combines the cancellation signals for the signal paths of all L sectors from interference estimator 1102*a* and provides a total cancellation signal $e_{total}^1$ for the first stage. A signal and interference combiner 1130*a*, which may be implemented with signal and interference combiner 1130 in FIG. 11, derives initial signal estimates for the signal paths of all L sectors based on the received signal r, the cancellation signals from interference estimator 1102a, and the total cancellation signal $e_{total}^{1}$ from combiner 1120a.

For the second stage, the initial signal estimates for the signal paths of all L sectors are provided to an interference estimator 1102b, which may also be implemented with interference estimator 1102 in FIG. 11. Interference estimator 1102b derives cancellation signals for the signal paths of the L sectors. The cancellation signals from the second stage are derived based on the initial signal estimates having the interference from the other sectors suppressed and are thus typically better estimates than the cancellation signals from the first stage. A combiner 1120b additively combines the cancellation signals for the signal paths of all L sectors from interference estimator 1102b and provides a total cancellation signal $e_{total}^{2}$ for the second stage. A signal and interference combiner 1130b derives final signal estimates for the signal paths of all L sectors based on the received signal r, the cancellation signals from interference estimator 1102b, and the total cancellation signal $e_{total}^{2}$ from combiner 1120b.

For the embodiments shown in FIGS. 11 and 12, a cancellation signal is derived for each sector but the interference cancellation is performed for individual signal paths of each sector. Each processing path from the received signal r to a finger processor 650 in FIGS. 11 and 12 is for one signal path of one sector. However, the processing paths for all signal paths of each sector share the same QLIC block(s). The interference cancellation may also be performed in other manners.

For the embodiments shown in FIGS. 4A-4H, 5, and 9A through 9D, the size of the FHT and IFHT is determined by the longest Walsh code used for transmission, which may be 128 chips for cdma2000 and 512 chips for W-CDMA. The pilot may be transmitted with Walsh code 0 and using either fixed modulation or no modulation. In this case, the pilot Walsh code is theoretically infinite in duration. The pilot channel may be processed as a longer Walsh code (e.g., 4N) to improve the quality of the pilot estimate.

In an embodiment, the pilot processing may be performed as follows. For each symbol period m, an N-point FHT is performed on N input samples for symbol period m to obtain N received symbols for the N Walsh codes. Four received symbols obtained for the pilot Walsh code in four symbol periods, e.g., the current symbol period m and the three most recent symbol periods m−1, m−2 and m−3, may be transformed with a 4-point FHT to obtain four decovered symbols for four Walsh sub-bins of the pilot Walsh code. One Walsh sub-bin is for the pilot and the other three Walsh sub-bins are noise. N−1 received symbols obtained for the N−1 non-pilot Walsh codes in the current symbol period m and the four decovered symbols for the four pilot Walsh sub-bins (or a total of N+3 symbols) are then processed, e.g., by blocks 422, 424, 426 and 440 in FIG. 4, to obtain N+3 scaled symbols. A 4-point IFHT is then performed on the four scaled symbols for the four pilot Walsh sub-bins to obtain four covered symbols. The covered symbol for the Walsh sub-bin for the pilot is provided as the scaled symbol for the pilot Walsh code, and the covered symbols for the other three Walsh sub-bins are discarded. N scaled symbols for the N Walsh codes are then processed, e.g., by blocks 442, 444 and 446 in FIG. 4A-4H, to obtain the interference-canceled samples for the current symbol period m. The decovered symbol for the pilot Walsh sub-bin has a higher SNR due to the extra averaging, which may improve the interference cancellation.

Figure 13:
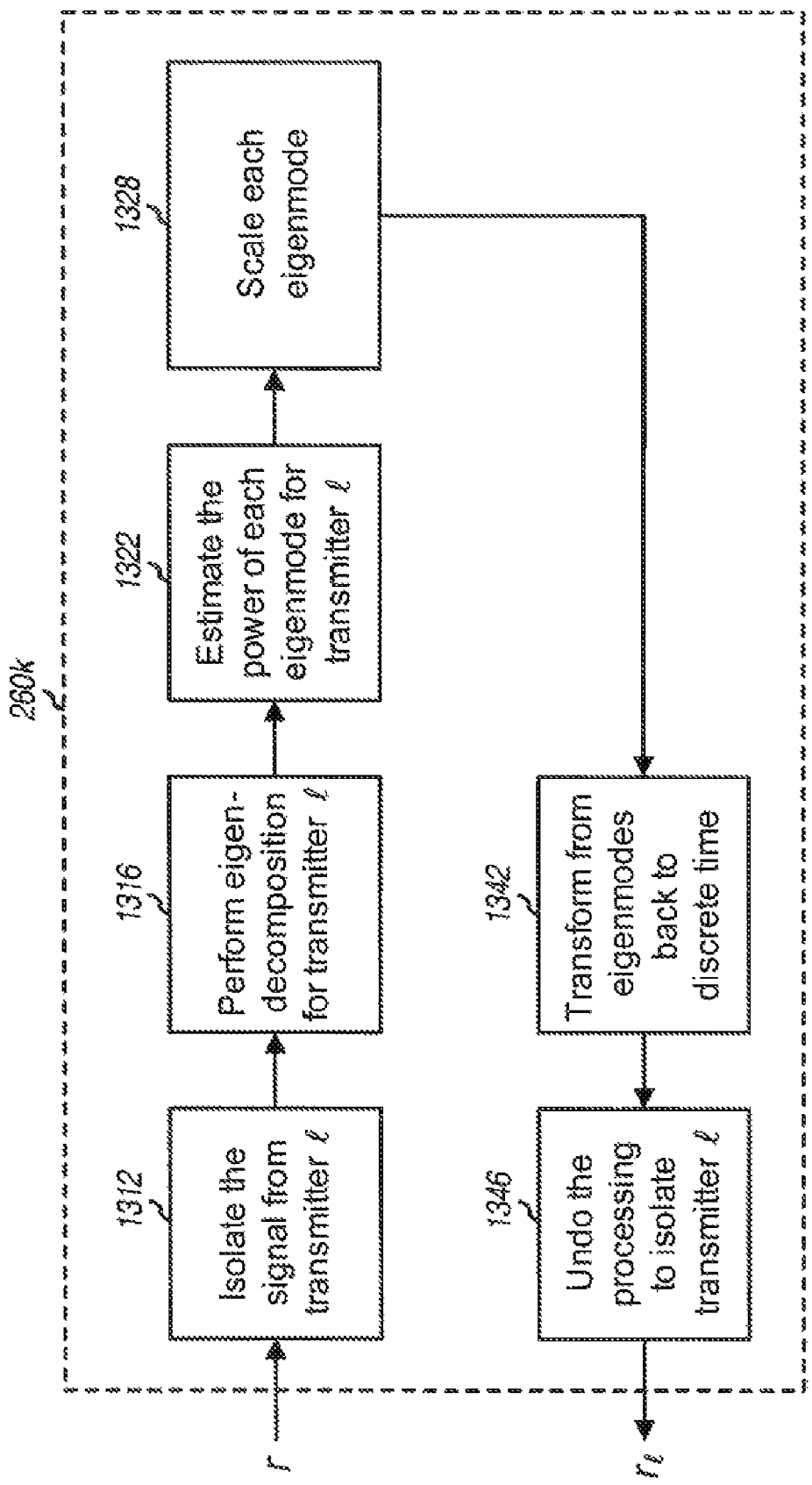
FIG. 13 shows a generic quasi-linear interference canceller.

FIG. 13 shows a block diagram of an embodiment of a generic quasi-linear interference canceller 260k, which may be applicable for various communication systems. Received samples are initially obtained. These received samples may be in the time domain (e.g., for CDMA) or the frequency domain (e.g., for OFDM). The received samples are processed to isolate the signal from an interfering transmitter l (block 1312). The processing in block 1312 may be a non-linear operation such as despreading for cdma2000, descrambling for W-CDMA, and so on. Eigen-decomposition is then performed to obtain multiple eigenmodes or orthogonal channels for transmitter l (block 1316). Orthogonal channels are obtained with different Walsh codes for cdma2000 and with different OVSF codes for W-CDMA. Hence, the eigen-decomposition may be achieved with an FHT for cdma2000 and W-CDMA. Eigen-decomposition may be achieved with a fast Fourier transform (FFT) for OFDM and FDMA systems and with other types of transform for other systems.

Interference cancellation may be achieved by performing linear or non linear scaling for each orthogonal channel. Each eigenmode is scaled at step 1328. The orthogonal channels are then transformed back to discrete time using the inverse of the transform used for eigen-decomposition (block 1342). The processing to isolate transmitter is then undone (block 1346). The processing in block 1346 may be a non-linear operation such as spreading for cdma2000, scrambling for W-CDMA, and so on.

A wireless device may maintain one or more sets of sectors such as (1) an active set containing sectors with which the wireless device is in communication, (2) a neighbor set containing sectors that are neighbors of the sectors in the active set, (3) a candidate set containing sectors that are strongly received by the wireless device and are candidates for inclusion in the active set, and/or (4) some other sector sets. The interference cancellation may be performed in various manners. In an embodiment, interference cancellation is performed for sectors that are in the active set. The wireless device typically receives these sectors strongly and further has timing and multipath information to effectively perform interference cancellation for these sectors. In another embodiment, interference cancellation is performed for as many sectors as possible based on the processing capability of the wireless device. The sectors may be selected for interference cancellation based on their received signal strength or some other criteria The interference cancellation techniques described herein provide various advantages. First, the interference cancellation processing may be performed for one sector at a time and is a relatively simple form of interference cancellation. Second, the eigenmodes (which correspond to orthogonal traffic channels) for each sector may be efficiently obtained by performing FHT. Third, for some embodiments described above, the eigenvalues for the eigenmodes (which are power estimates used for the LMMSE interference cancellation) may be easily inverted without having to perform matrix inversion. Fourth, the interference cancellation is performed based on a low latency interference estimate for the sector being canceled, which is obtained by performing symbol processing. This is in contrast to an interference estimate obtained by decoding, re-encoding, and remodulating a frame or packet of data, which may be difficult or impractical to implement and has a higher latency because of the frame processing.

The techniques described herein may improve the overall system capacity on the forward link of a CDMA system. The capacity on the forward link is interference limited. That is, as the number of wireless devices communicating with the CDMA system increases, the total power transmitted to these wireless devices increases, which increases the interference observed by each wireless device. Eventually, the interference is such that no more wireless device can connect to the CDMA system. The techniques described herein reduce the deleterious effects of interference at the wireless device. Less transmit power may then be used for the wireless device to achieve the same level of performance, which reduces the interference to other wireless devices and allows more wireless devices to connect to the system.

The interference cancellation techniques described herein may be implemented by various means. For example, these techniques may be implemented in hardware, firmware, software, or a combination thereof. For a hardware implementation, the processing units used to perform interference cancellation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a software implementation, the interference cancellation techniques may be implemented with modules (e.g., procedures, functions, and so on) that perform the functions described herein. The software codes may be stored in a memory (e.g., memory 292 in FIG. 2) and executed by a processor (e.g., controller 290). The memory may be implemented within the processor or external to the processor.

The methods and apparatus of this invention may take the form, at least partially, of program logic or program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, through a wireless transmission channel, or via any other form of transmission. When the program code is received and loaded into and executed by a machine, such as a processor, the machine becomes an apparatus for practicing the invention. When implemented on a general-purpose processor, the program code combines with the processor to provide a unique apparatus that operates analogously to specific logic circuits.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
   a decover unit configured to decover input samples to obtain received symbols for multiple orthogonal channels, the input samples corresponding to signals transmitted by a transmitter;
   a symbol processor coupled to the decover unit and including a noise estimator configured to generate noise estimates associated with the multiple orthogonal channels, wherein the symbol processor is configured to scale the received symbols for the multiple orthogonal channels with multiple gains and with the noise estimates to obtain scaled symbols for the multiple orthogonal channels, wherein the symbol processor is configured to scale the received symbols to generate estimated transmitted symbols corresponding to the received symbols, wherein each estimated transmitted symbol has an in phase component that includes a hyperbolic tangent of an in phase component of a corresponding scaled symbol and wherein each estimated transmitted symbol has a quadrature component that includes a hyperbolic tangent of a quadrature component of the corresponding scaled symbol; and
   a covering unit configured to cover the scaled symbols to generate output samples.

2. The apparatus of claim 1, further comprising:
   a despreader configured to despread received samples comprising the signals transmitted by the transmitter to generate the input samples; and
   a spreader configured to spread the output samples to generate interference-cancelled samples comprising the received samples with reduced input samples,
   wherein the decover unit comprises a transformer configured to transform the input samples based on a transform to obtain the received symbols for the multiple orthogonal channels, and wherein the covering unit comprises an inverse transform unit configured to transform the scaled symbols based on an inverse of the transform to generate the output samples.

3. The apparatus of claim 2, further comprising an estimator configured to generate a cancellation signal corresponding to an estimate of the transmitted signals based on the interference-cancelled samples.

4. The apparatus of claim 3, wherein the despreader, the decover unit, the symbol processor, the covering unit, the spreader and the estimator form an interference cancellation block, the apparatus further comprising:
   another interference cancellation block configured to generate another cancellation signal corresponding to an estimate of transmitted signals transmitted from another transmitter; and
   a finger processor configured to demodulate a desired signal reduced by the another cancellation signal.

5. The apparatus of claim 4, further comprising:
   a first summer to subtract the cancellation signal from the received samples to generate an intermediate signal to be input to the another interference cancellation block; and
   a second summer to subtract the another cancellation signal from the received samples to generate the desired signal.

6. The apparatus of claim 1, wherein the symbol processor further comprises a gain estimator configured to generate the multiple gains, and wherein the symbol processor further comprises a non-linear weighting function module configured to accept as inputs the multiple gains of the gain estimator, the noise estimates of the noise estimator, and the received symbols from the decover unit.

7. The apparatus of claim 6, wherein the gain estimator comprises a magnitude calculator and a low pass filter.

8. The apparatus of claim 1, wherein the symbol processor is configured to scale the received symbols in accordance with a hyperbolic function.

9. The apparatus of claim 8, wherein the symbol processor is configured to scale the received symbols in accordance with the function:

$$\hat{s} = \sqrt{\frac{1}{2}} g\left(\tanh\left(\text{real}\left(\frac{g}{\sigma^2}\check{s}\right)\right) + i\tanh\left(\text{imag}\left(\frac{g}{\sigma^2}\check{s}\right)\right)\right)$$

where
$\check{s}$ is the received symbol;
$\hat{s}$ is an estimate of a transmitted symbol corresponding to the received symbol;
g is a gain of the transmitted symbol applied at a transmitter; and
$\sigma^2$ is a noise power on the received symbol.

10. The apparatus of claim 1, wherein the in phase component of the estimated transmitted symbol and the quadrature component of the estimated transmitted symbol are each scaled by an estimated gain factor.

11. The apparatus of claim 10, wherein the in phase component of the corresponding scaled symbol and the quadrature component of the corresponding scaled symbol are each scaled by a ratio of transmitter gain to received noise power.

12. A method comprising:
decovering input samples to obtain received symbols for multiple orthogonal channels, the input samples corresponding to signals transmitted by a transmitter;
scaling the received symbols for the multiple orthogonal channels with multiple gains and with noise estimates to obtain scaled symbols for the multiple orthogonal channels, wherein scaling the received symbols includes generating estimated transmitted symbols corresponding to the received symbols, wherein each estimated transmitted symbol has an in phase component that includes a hyperbolic tangent of an in phase component of a corresponding scaled symbol and wherein each estimated transmitted symbol has a quadrature component that includes a hyperbolic tangent of a quadrature component of the corresponding scaled symbol; and
covering the scaled symbols to generate output samples.

13. The method of claim 12, further comprising:
despreading received samples comprising the signals transmitted by the transmitter to generate the input samples; and
spreading the output samples to generate interference-cancelled samples comprising the received samples with reduced input samples.

14. The method of claim 13, further comprising generating a cancellation signal corresponding to an estimate of the transmitted signals based on the interference-cancelled samples.

15. The method of claim 14, wherein the despreading, decovering, scaling, covering, spreading, and generating performs interference cancellation, the method further comprising:
performing interference cancellation to generate another cancellation signal corresponding to an estimate of transmitted signals transmitted from another transmitter; and
demodulating a desired signal reduced by the another cancellation signal.

16. The method of claim 15, further comprising:
subtracting the cancellation signal from the received samples to generate an intermediate signal for generating the another cancellation signal; and subtracting the another cancellation signal from the received samples to generate the desired signal.

17. The method of claim 12, wherein the decovering comprises transforming input symbols based on a transform to obtain received symbols for multiple orthogonal channel and wherein the covering comprises transforming the scaled symbols based on an inverse of the transform to generate output samples.

18. The method of claim 12, wherein the scaling comprises non-linearly scaling the received symbols.

19. The method of claim 18, wherein the scaling comprises scaling the received symbols in accordance with a hyperbolic function.

20. The method of claim 19, wherein the scaling comprises scaling the received symbols in accordance with the function:

$$\hat{s} = \sqrt{\frac{1}{2}} g\left(\tanh\left(\text{real}\left(\frac{g}{\sigma^2}\check{s}\right)\right) + i\tanh\left(\text{imag}\left(\frac{g}{\sigma^2}\check{s}\right)\right)\right)$$

where
$\check{s}$ is the received symbol;
$\hat{s}$ is an estimate of a transmitted symbol corresponding to the received symbol;
g is a gain of the transmitted symbol applied at a transmitter; and
$\sigma^2$ is a noise power on the received symbol.

21. The method of claim 12, wherein the in phase component of the estimated transmitted symbol and the quadrature component of the estimated transmitted symbol are each scaled by an estimated gain factor.

22. The method of claim 21, wherein the in phase component of the corresponding scaled symbol and the quadrature component of the corresponding scaled symbol are each scaled by a ratio of transmitter gain to received noise power.

23. A processor configured to:
decover input samples to obtain received symbols for multiple orthogonal channels, the input samples corresponding to signals transmitted by a transmitter;
scale the received symbols for the multiple orthogonal channels with multiple gains and with noise estimates to obtain scaled symbols for the multiple orthogonal channels, wherein scaling the received symbols includes generating estimated transmitted symbols corresponding to the received symbols, wherein each estimated transmitted symbol has an in phase component that includes a hyperbolic tangent of an in phase component of a corresponding scaled symbol and wherein each estimated transmitted symbol has a quadrature component that includes a hyperbolic tangent of a quadrature component of the corresponding scaled symbol; and
cover the scaled symbols to generate output samples.

24. The processor of claim 23, further configured to:
despread received samples comprising the signals transmitted by the transmitter to generate the input samples; and
spread the output samples to generate interference-cancelled samples comprising the received samples with reduced input samples.

25. The processor of claim 24 further configured to decover the input samples by transforming input symbols based on a transform to obtain received symbols for multiple orthogonal channel and to cover the scales symbols by transforming the scaled symbols based on an inverse of the transform to generate output samples.

26. The processor of claim 24 further configured to generate a cancellation signal corresponding to an estimate of the transmitted signals based on the interference-cancelled samples.

27. The processor of claim 23 further configured to scale the received symbols by non-linearly scaling the received symbols.

28. The processor of claim 27 further configured to scale the received symbols by scaling the received symbols in accordance with a hyperbolic function.

29. The processor of claim 28 further configured to scale the received symbols by scaling the received symbols in accordance with the function: wherein the symbol processor is configured to scale the received symbols in accordance with the function:

$$\hat{\hat{s}} = \sqrt{\frac{1}{2}} g\left(\tanh\left(\text{real}\left(\frac{g}{\sigma^2}\check{s}\right)\right) + i\tanh\left(\text{imag}\left(\frac{g}{\sigma^2}\check{s}\right)\right)\right)$$

where
š is the received symbol;
$\hat{\hat{s}}$ is an estimate of a transmitted symbol corresponding to the received symbol;
g is a gain of the transmitted symbol applied at a transmitter; and
$\sigma^2$ is a noise power on the received symbol.

30. The processor of claim 23, wherein the in phase component of the estimated transmitted symbol and the quadrature component of the estimated transmitted symbol are each scaled by an estimated gain factor.

31. The processor of claim 30, wherein the in phase component of the corresponding scaled symbol and the quadrature component of the corresponding scaled symbol are each scaled by a ratio of transmitter gain to received noise power.

32. A computer program product, comprising:
a tangible computer-readable medium having computer-readable code that, when executed by a computer, causes the computer to:
decover input samples to obtain received symbols for multiple orthogonal channels, the input samples corresponding to signals transmitted by a transmitter;
scale the received symbols for the multiple orthogonal channels with multiple gains and with noise estimates to obtain scaled symbols for the multiple orthogonal channels, wherein scaling the received symbols includes generating estimated transmitted symbols corresponding to the received symbols, wherein each estimated transmitted symbol has an in phase component that includes a hyperbolic tangent of an in phase component of a corresponding scaled symbol and wherein each estimated transmitted symbol has a quadrature component that includes a hyperbolic tangent of a quadrature component of the corresponding scaled symbol; and
cover the scaled symbols to generate output samples.

33. The computer program product of claim 32, wherein the computer-readable code is further operable, when executed by the computer, to cause the computer to:
despread received samples comprising the signals transmitted by the transmitter to generate the input samples; and
spread the output samples to generate interference-cancelled samples comprising the received samples with reduced input samples.

34. The computer program product of claim 32, wherein the computer-readable code is further operable, when executed by the computer, to cause the computer to transform input symbols based on a transform to obtain received symbols for multiple orthogonal channel and wherein causing the computer to cover comprises causing the computer to transform the scaled symbols based on an inverse of the transform to generate output samples.

35. The computer program product of claim 32, wherein causing the computer to scale comprises causing the computer to non-linearly scale the received symbols.

36. The computer program product of claim 35, wherein causing the computer to scale comprises causing the computer to scale the received symbols in accordance with a hyperbolic function.

37. The computer program product of claim 36, wherein causing the computer to scale comprises causing the computer to scale the received symbols in accordance with the function:

$$\hat{\hat{s}} = \sqrt{\frac{1}{2}} g\left(\tanh\left(\text{real}\left(\frac{g}{\sigma^2}\check{s}\right)\right) + i\tanh\left(\text{imag}\left(\frac{g}{\sigma^2}\check{s}\right)\right)\right)$$

where
š is the received symbol;
$\hat{\hat{s}}$ is an estimate of a transmitted symbol corresponding to the received symbol;
g is a gain of the transmitted symbol applied at a transmitter; and
$\sigma^2$ is a noise power on the received symbol.

38. The computer program product of claim 32, wherein the in phase component of the estimated transmitted symbol and the quadrature component of the estimated transmitted symbol are each scaled by an estimated gain factor.

39. The computer program product of claim 38, wherein the in phase component of the corresponding scaled symbol and the quadrature component of the corresponding scaled symbol are each scaled by a ratio of transmitter gain to received noise power.

40. An apparatus comprising:
means for decovering input samples to obtain received symbols for multiple orthogonal channels, the input samples corresponding to signals transmitted by a transmitter;
means for symbol processing to scale the received symbols for the multiple orthogonal channels with multiple gains and with noise estimates to obtain scaled symbols for the multiple orthogonal channels, wherein the means for symbol processing is configured to scale the received symbols to generate estimated transmitted symbols corresponding to the received symbols, wherein each estimated transmitted symbol has an in phase component that includes a hyperbolic tangent of an in phase component of a corresponding scaled symbol and wherein each estimated transmitted symbol has a quadrature component that includes a hyperbolic tangent of a quadrature component of the corresponding scaled symbol; and
means for covering to cover the scaled symbols to generate output samples.

41. The apparatus of claim 40, further comprising:
means for despreading to despread received samples comprising the signals transmitted by the transmitter to generate the input samples; and means for spreading to spread the output samples to generate interference-cancelled samples comprising the received samples with reduced input samples.

42. The apparatus of claim 41, further comprising means for generating to generate a cancellation signal corresponding to an estimate of the transmitted signals based on the interference-cancelled samples.

43. The apparatus of claim 42, wherein the means for despreading, the means for decovering, the means for symbol processing, the means for covering, the means for spreading, and the means for generating form means for interference cancelling, the apparatus further comprising:
   another means for interference cancelling to generate another cancellation signal corresponding to an estimate of transmitted signals transmitted from another transmitter; and
   means for demodulating to demodulate a desired signal reduced by the another cancellation signal.

44. The apparatus of claim 43, further comprising:
   a first subtracting means to subtract the cancellation signal from the received samples to generate an intermediate signal for generating the another cancellation signal by the another means for interference cancelling; and
   a second means for subtracting to subtract the another cancellation signal from the received samples to generate the desired signal.

45. The apparatus of claim 40 wherein the means for decovering comprises means for transforming to transform input symbols based on a transform to obtain received symbols for multiple orthogonal channel and wherein the means for covering unit means for inverse transforming to transform the scaled symbols based on an inverse of the transform to generate output samples.

46. The apparatus of claim 40, wherein the means for symbol processing comprises means for scaling to non-linearly scale the received symbols.

47. The apparatus of claim 46, wherein the means for scaling is to scale the received symbols in accordance with a hyperbolic function.

48. The apparatus of claim 47, wherein the means for scaling is to scale the received symbols in accordance with the function:

$$\hat{\hat{s}} = \sqrt{\frac{1}{2}} \, g\!\left(\tanh\!\left(\text{real}\!\left(\frac{g}{\sigma^2}\tilde{s}\right)\right) + i\tanh\!\left(imag\!\left(\frac{g}{\sigma^2}\tilde{s}\right)\right)\right)$$

where
   $\tilde{s}$ is the received symbol;
   $\hat{\hat{s}}$ is an estimate of a transmitted symbol corresponding to the received symbol;
   g is a gain of the transmitted symbol applied at a transmitter; and
   $\sigma^2$ is a noise power on the received symbol.

49. The apparatus of claim 40, wherein the in phase component of the estimated transmitted symbol and the quadrature component of the estimated transmitted symbol are each scaled by an estimated gain factor.

50. The apparatus of claim 49, wherein the in phase component of the corresponding scaled symbol and the quadrature component of the corresponding scaled symbol are each scaled by a ratio of transmitter gain to received noise power.

* * * * *